(12) United States Patent
Akedo et al.

(10) Patent No.: US 7,553,376 B2
(45) Date of Patent: Jun. 30, 2009

(54) APPARATUS FOR FORMING COMPOSITE STRUCTURES

(75) Inventors: Jun Akedo, Ibaraki (JP); Tomokazu Ito, Fukuoka (JP); Tatsuro Yokoyama, Fukuoka (JP); Katsuhiko Mori, Fukuoka (JP); Hironori Hatono, Fukuoka (JP); Masakatsu Kiyohara, Fukuoka (JP); Yuji Aso, Fukuoka (JP)

(73) Assignees: Toto Ltd., Fukuoka (JP); National Institute of Advanced Industrial Science & Technology, Tokyo (JP)

( * ) Notice: Subject to any disclaimer, the term of this patent is extended or adjusted under 35 U.S.C. 154(b) by 40 days.

(21) Appl. No.: 11/419,121

(22) Filed: May 18, 2006

(65) Prior Publication Data

US 2006/0201419 A1    Sep. 14, 2006

Related U.S. Application Data

(62) Division of application No. 10/070,104, filed on Oct. 3, 2002, now Pat. No. 7,153,567.

(30) Foreign Application Priority Data

Oct. 12, 1999   (JP)   .................................. 11-289904
Oct. 12, 2000   (WO)   ....................... PCT/JP00/07076

(51) Int. Cl.
   *B05C 5/02*   (2006.01)
(52) U.S. Cl. ..................... 118/308; 118/629; 118/323
(58) Field of Classification Search ................ 118/308, 118/629, 323, 50.1; 239/79, 310, 311, 690, 239/690.1; 73/865.5; 427/475
   See application file for complete search history.

(56) References Cited

U.S. PATENT DOCUMENTS 3,620,839 A  *  11/1971  Geckle et al. ................ 428/206

(Continued)

FOREIGN PATENT DOCUMENTS

JP        04-188503         7/1992

(Continued)

OTHER PUBLICATIONS

Seiichirou, Kashu; Kinzoku; Jan. 1989, The Gas Deposition Method.

(Continued)

*Primary Examiner*—Laura Edwards
(74) *Attorney, Agent, or Firm*—Carrier Blackman & Associates, P.C.; Joseph P. Carrier; William D. Blackman

(57) ABSTRACT

A composite structure forming apparatus adapted to ejecting and causing an aerosol generated by scattering brittle material fine particles in a gas to collide with a substrate at high speed to form a structure made of the brittle material. The apparatus includes an aerosol generator for generating the aerosol, a nozzle for ejecting the aerosol, a shredder for shredding the brittle particles cohering in the aerosol and preventing cohesion of the brittle material fine particles, and a classifier for classifying the brittle material fine particles in the aerosol. The apparatus also includes a pretreatment device for creating internal strain in the brittle material fine particles, and a position control device for controlling the position of the nozzle relative to the substrate. The apparatus further includes a container having a sieve and a vibration device, and one or more of these components may be associated with the aerosol generator.

31 Claims, 15 Drawing Sheets

U.S. PATENT DOCUMENTS

| | | | |
|---|---|---|---|
| 4,109,860 A * | 8/1978 | Serafin et al. | 238/349 |
| 4,205,964 A * | 6/1980 | Hill | 51/309 |
| 4,391,733 A * | 7/1983 | Lamar et al. | 252/378 R |
| 4,617,056 A * | 10/1986 | Mosser et al. | 106/1.12 |
| 4,660,986 A * | 4/1987 | Leschonski et al. | 366/154.2 |
| 5,143,288 A * | 9/1992 | Kohler et al. | 239/1 |
| 5,518,546 A * | 5/1996 | Williams et al. | 118/621 |
| 5,631,044 A | 5/1997 | Rangaswamy et al. | |
| 5,723,176 A * | 3/1998 | Keyworth et al. | 427/163.2 |
| 5,837,327 A * | 11/1998 | Sue et al. | 427/456 |
| 5,916,640 A * | 6/1999 | Liu et al. | 427/475 |
| 6,280,802 B1 | 8/2001 | Akedo et al. | |
| 6,349,668 B1 * | 2/2002 | Sun et al. | 118/723 R |
| 6,780,350 B1 * | 8/2004 | Kodas et al. | 264/9 |
| 2006/0102074 A1 * | 5/2006 | Hatono et al. | 118/663 |

FOREIGN PATENT DOCUMENTS

| | | |
|---|---|---|
| JP | 04-331074 | 11/1992 |
| JP | 08-081774 | 3/1996 |
| JP | 10-202171 | 8/1998 |
| JP | 11-021677 | 1/1999 |
| JP | 2000-212766 | 8/2000 |
| JP | 2000-313970 | 11/2000 |

OTHER PUBLICATIONS

Ikawa et al.; The Electrostatic Fine Particle Coating Method; Preprint for the Science Lecture Meeting, Autumn Convention, Precision Machine Society Shows 52 (1977).

"Preparation Of PZT Ferroelectric Thin Films by the Sol-Gel Process, Journal of Inorganic Materials, vol. 10, Mar. 1995, p. 113-116".

* cited by examiner

APPARATUS FOR FORMING COMPOSITE STRUCTURES

CROSS-REFERENCE TO RELATED APPLICATION

The present invention is a divisional application of U.S. patent application Ser. No. 10/070,104, filed on Oct. 3, 2002, now U.S. Pat. No. 7,153,567, which in turn is a 371 (national phase) of PCT International Serial No. PCT/JP00/07076 filed Oct. 12, 2000. The subject matter of these priority documents is incorporated herein by reference.

BACKGROUND OF THE INVENTION

1. Field of the Invention

The present invention relates to an apparatus for forming a composite structure made of a brittle material such as a ceramic or a metalloid formed on a substrate surface. More particularly, the present invention relates to a composite structure forming apparatus for ejecting and causing an aerosol generated by scattering brittle material fine particles in a gas to collide with a substrate at high speed to from a structure made of brittle material.

2. Description of the Prior Art

Generally, when a ceramics sintered body is formed, a liquid phase sintering is carried out in which a sintering assistant is added to make the inter-jointing of ceramic particles easier so as to form a liquid phase near the boundary face at which the particles join.

Hot pressing is known as a method for forming a high-density sintered body without using the sintering assistant. A vapor deposition method such as PVD and CVD or a thermal spraying method is also known as a method of forming a coat such as a metal or a ceramic on a substrate surface.

On the other hand, a gas deposition method (published in a metal magazine "KINZOKU" issued in January 1989 by Mr. KASHU, Seiichiro) and an electrostatic fine particle coating method (published in an advance printing used in an academic lecture meeting by Mr. Ikawa et al. in the Precision Machine Society of Japan held in the autumn of 1977) are also known as new coat-forming methods. In the former, it is a basic principle that ultra-fine particles such as metal or ceramic are made into an aerosol by gas agitation and accelerated through a minute nozzle. When the ultra-fine particles collide with a substrate, a part of their kinetic energy is converted to thermal energy to cause sintering between the fine particles or between the fine particles and the substrate. In the latter, it is a basic principle that fine particles are charged and accelerated using a gradient of an electric field, and then sintered in the same manner as in the gas deposition method using the thermal energy generated when the fine particles collide with the substrate.

Further, examples of the prior art which have improved the gas deposition method or the electrostatic fine particle coating method stated above are disclosed in Japanese Unexamined Patent Publication No. HEI 8-81774, Japanese Unexamined Patent Publication No. HEI 10-202171, Japanese Unexamined Patent Publication No. HEI 11-21677 or Japanese Unexamined Patent Publication No. 2000-212766.

In the art disclosed in Japanese Unexamined Patent Publication No. HEI 8-81774, two kinds of metal or organic substances with different melting points are heated to evaporation by resistance wire heating, electron beam heating, high-frequency induction heating, sputtering, arc plasma or the like to produce ultra-fine particles of 0.1 µm or less of which the surface is very active. These ultra-fine particles are sprayed, every metal with a different melting point, on a substrate using a nozzle based on sectional CAD data for a three-dimensional shape. This operation is repeated to form a substance with a three-dimensional shape consisting of two kinds of metals with different melting points. The substance with a three-dimensional shape is then heated at an intermediate temperature between the melting points of the two kinds of metal to melt and remove a metal portion with a low melting point, thereby leaving a metal portion with a high melting point.

In the art disclosed in Japanese Unexamined Patent Publication No. HEI 10-202171, the ultra-fine particles obtained by heating and evaporating the metal or the organic substance using resistance wire heating, electron beam heating, high-frequency induction heating, sputtering, arc plasma or the like as stated above are sprayed on the substrate through an opening of a mask. In this manner, a substance of a three-dimensional shape with no sagging shoulders is formed.

In the art disclosed in Japanese Unexamined Patent Publication No. HEI 11-21677, when an aerosol including the above-mentioned ultra-fine particles is conveyed or the metal or a ceramic is heated and evaporated, a classifying device is provided in an intermediate channel to prevent the ultra-fine particles from cohering together to become larger particles.

Referring to the art disclosed in Japanese Unexamined Patent Publication No. 2000-212766, when an ion beam, an atomic beam, a molecular beam or a low temperature plasma is irradiated on the ultra-fine particles of 10 nm~5 µm (which are not obtained by heating and evaporation unlike the above-mentioned prior art), the ultra-fine particles are activated without melting. In such a condition, the activated ultra-fine particles are sprayed onto the substrate at a speed of 3 m/sec.~300 m/sec. to promote inter-jointing of the ultra-fine particles thereby forming a structure.

In the liquid phase sintering using a general sintering assistant, a glassy phase including the sintering assistant is formed near a grain boundary. As a result, purity of the ceramics obtained does not increase, and it is difficult to form a compact body.

On the other hand, it is possible to form ceramics of high purity and compactness thanks to the atomization of ceramic particles, adoption of a high sintering temperature, baking under a pressurized environment such as the hot pressing method or the like, removal of the sintering assistant, etc. However, inclusive of the above, to effect baking is to let the particles join together by the diffusion of atoms and even though the raw powder is minute particles, particle growth is produced during heating. It is therefore impossible to let a formed subject remain as minute crystals. Namely, in baking, it is difficult to form a polycrystalline substance consisting of crystal grains of a nanometer level.

Further, during baking using a sintering assistant, a specific element segregates on a boundary face between the particles, resulting in preventing the accomplishment of the desired characteristics.

On the other hand, in PVD or CVD, there is a technical characteristic whereby a structure is formed by accumulation of atoms. Since a crystal plane of which the crystal growth energy is low grows faster, there is a characteristic structure that the crystal is oriented or the crystal is formed in a columnar shape from the substrate. It is therefore difficult to form a granular polycrystalline substance with disordered crystal orientation.

Referring to thermal spraying, compactness of the formed subject is attained thanks to atomization of the raw powder, processing at high temperature, environment under reduced pressure or the like. However, there is a technical characteristic whereby a surface layer of the raw powder is melted to collide with the substrate and let the particles join together. Accordingly, there is a problem that the crystals of the formed subject are shaped by deposition of flat particles in layers or non-molten particles are mixed into the formed subject. It is also difficult to form the polycrystalline substance consisting of crystal grains in the nanometer level. From the process point of view, there is still a problem whereby all the techniques above require a high temperature environment from several hundreds to 10,000° C. and the energy input is quite large.

Referring further to formation of a ceramic coat by a sol-gel method, a technique that can form a coat of which the crystallite is comparatively small at a low temperature has been developed. However, the coat thickness attained in one coat forming process is generally at a level from several nm to several hundreds nm, and when a thick coat is formed, it is necessary to repeat this process. In this case, it is substantially necessary to apply a heat treatment to strengthen the coat that is already applied, wherein particle growth is caused in such a coat layer. There is a problem that the compactness does not increase when a coat is formed at a low temperature at which the particle growth is not produced. A problem whereby a crack is produced on the coat when the coat forming process is repeated many times has not yet been solved. Further, the ceramics coat forming method for a fine structure such as the sol-gel method or a deposition method in a solution is a wet process in many cases. Thus, there is some possibility that other solutes or solvents in the solution are mixed in the coat to generate deterioration of the coat characteristics or deformation of composition.

In the methods disclosed in Japanese Unexamined Patent Publication No. HEI 8-81774, Japanese Unexamined Patent Publication No. HEI 10-202171, and Japanese Unexamined Patent Publication No. HEI 11-21677, heating means for obtaining the ultra-fine particles (such as resistance wire heating, electron beam heating, high-frequency induction heating, sputtering or arc plasma) is needed. Further, since the basic principle is that the kinetic energy is converted to thermal energy upon collision to effect sintering, a particle size of the structure formed on the substrate is larger than that of the ultra-fine particles of the raw material due to particle growth.

On the other hand, applicants of the present invention have improved the techniques disclosed in Japanese Unexamined Patent Publication No. 2000-212766. As a result, it became clear that a brittle material such as a ceramic or a metalloid shows a different behavior from a metal (spreading material).

In the brittle material, it was possible to form a structure without irradiating with an ion beam, atomic beam, molecular beam, low temperature plasma, etc., in other words, without using any particular activation means. However, even though fine particles of 10 nm~5 μm and a collision speed of 3 m/sec.~300 m/sec. which are the conditions described in the published specification, are met, there were new problems in that peel strength of the structure is not enough, partial peeling can easily occur, or the density is not uniform.

SUMMARY OF THE INVENTION

The present invention was completed based on the following knowledge.

The ceramic is in an atomic bond state in which covalent bonding or ionic bonding which does not generally have a free electron is strong. Thus, the ceramic shows strong resistance to hardness, but is weak against impact. A metalloid such as silicon or germanium is also a brittle material that does not exhibit spreading.

Accordingly, when a mechanical impact force is applied to these brittle materials, deformation of a crystal lattice is caused, for example, along a cleavage plane such as a boundary face of crystallites, or the brittle material is fractured. Once these phenomena are caused, atoms that initially existed inside and have bonded with other atoms appear in the deformed surface or the fracture surface. In other words, new surfaces are formed therein. One atomic layer section of this newly formed surface is forcibly exposed in an unstable state instead of a stable atomic bonding state by external force. Namely, the atomic layer section is placed in a state of high surface energy. This active surface bonds with the adjacent brittle material surface, the adjacent newly formed surface of the brittle material, or a substrate surface and becomes stable. Addition of a continuous external mechanical impact force continuously generates this phenomenon and as a result of repeated deformation, fracture or the like of fine particles, development of bonding and compactness of the structure formed by the development of bonding are effected. In this manner, the structure of the brittle material is formed.

A microscopic construction of the structure made of brittle materials according to the present invention based on the above-mentioned knowledge is obviously different from that of the structure obtained by conventional manufacturing methods.

Namely, a composite structure according to the present invention is provided in which a structure made of a brittle material such as a ceramic or a metalloid is formed on a substrate surface, characterized in that the structure is polycrystalline, crystals forming the structure are not substantially provided with crystal orientation, a boundary layer consisting of hyaline does not substantially exist on a boundary face of the crystals, and part of the structure is an anchor section which bites into the substrate surface.

Now, the terms important to understand the present invention are defined as follows.

Polycrystal

The term "Polycrystal" means a structure formed by joining and integrating a crystallite. The crystallite substantially forms a crystal by itself and the size (diameter) thereof is usually 5 nm or more. There is some possibility that the fine particles exist in the structure without being fractured, but they are substantially polycrystalline.

Crystal Orientation

The term "Crystal Orientation" means an orientation state of a crystal axis in the structure that is polycrystalline. JCPDS (ASTM) data used as standard data by an X-ray diffraction of powder which is generally considered to substantially have no orientation is used here as an index of judgement as to whether there is any orientation in the crystals. In a viewpoint shown in a twelfth embodiment described below, reference is made to "substantially no orientation" when the displacement of a major peak falls within 30%.

Boundary Face

The term "Boundary Face" means an area where a boundary is formed between crystallites.

Boundary Layer

The term "Boundary Layer" means a layer which has a certain thickness (usually several nm~several μm) in a boundary face or a grain boundary which is referred to in a sintered body. The boundary layer usually has an amorphous structure that is different from a crystal structure within a crystal grain. In some cases, it includes segregation of impurities.

Anchor Section

The term "Anchor Section" means an irregularity formed on the boundary between a substrate and a structure. In particular, the irregularity is not formed on the substrate in advance, but formed by changing surface precision of the original substrate when a structure is formed.

Average Crystallite Size

The term "Average Crystallite Size" means the size of a crystallite computed by a method of Scherrer in an X-ray diffraction method. In the present invention, the sizes were measured and computed using an MXP-18 made by MAC Science Co., Ltd.

Nonstoichiometric Deficiency

The term "Nonstoichiometric Deficiency" means a state in which one or more kinds of elements are missing from a compound composition of crystals forming a structure and as a result, the composition ratio is changed. The existence of this nonstoichiometric deficiency section can be checked using an alternative characteristic such as electric resistivity.

Internal Strain

The term "Internal Strain" means a lattice strain included in the fine particles and is a value calculated using the Hall Method in an X-ray diffraction measurement. A reference material in which the fine particles are sufficiently annealed is used as a standard and the displacement relative to the reference material is shown by a percentage.

Re-cohesion

The term "Re-cohesion" means a state in which minute fragments fractured or dropped from the surface of primary particles of the fine particles during crushing or milling of the fine particles adhere to and bond with the surface of the primary particles (which are not necessarily the same) to form a surface layer.

Referring to a structure consisting of a brittle material formed by conventional sintering, the crystals involve particle growth due to heat and, in particular, when a sintering assistant is used, a hyaline is produced as a boundary layer.

Further, since the composite structure according to the present invention, involves deformation or fracture of the raw fine particles, constitutive particles of the structure are smaller than the raw fine particles. For example, if the average size of the fine particles measured by a laser diffraction method or a laser scattering method is 0.1~5 μm, the average crystallite size of the structure formed is 100 nm or less in many cases. In this manner, the composite structure has a polycrystalline substance consisting of these fine crystallites as its composition. As a result, it is possible to form a compact composite structure of which the compactness is 70% or more when the average crystallite size is 500 nm or less, or the compactness is 95% or more when the average crystallite size is 100 nm or less, or the compactness is 99% or more when the average crystallite size is 50 nm or less.

Now, the compactness (%) can be computed from the following expression using the true specific gravity from a bibliographic value or a theoretically calculated value and the bulk specific gravity obtained by the weight and bulking value of the structure:

Compactness=(Bulk specific gravity/true specific gravity)×100 (%)

Further, since the characteristic of the composite structure according to the present invention involves deformation or fracture due to mechanical impact such as a collision, it is difficult to get a flat or elongated crystal shape. Accordingly, the crystallite shape is substantially granular and its aspect ratio is about 2.0 or less. Further, since the composite structure is a section where fragmentary particles rejoined after fracture of the fine particles, there is no crystal orientation. Since the composite structure is almost compact, it has excellent mechanical and chemical properties such as hardness, wear and abrasion resistance and corrosion resistance.

In the present invention, since the action from fracturing of the raw fine particles to the re-joining thereof is carried out in an instant, diffusion of atoms is seldom effected near the surface of minute fragmentary particles during joining. Accordingly, there is no disorder in the atomic arrangement at the boundary face of crystallites of the structure. A boundary layer (hyaline) which is a dissolved layer is seldom formed. Even if the boundary layer is formed, the thickness of the layer is 1 nm or less. Accordingly, the composite structure shows excellent characteristics for the chemical properties such as corrosion resistance.

Further, the composite structure according to the present invention includes a crystal with a nonstoichiometric deficient section (for example, deficiency of oxygen) near the boundary face of the crystals forming the structure.

A substrate forming the composite structure according to the present invention includes glass, metal, ceramic, metalloid or an organic compound. A brittle material includes the following: an oxide such as aluminum oxide, titanium oxide, zinc oxide, tin oxide, iron oxide, zirconium oxide, yttrium oxide, chromium oxide, hafnium oxide, beryllium oxide, magnesium oxide or silicon oxide; carbide such as diamond, boron carbide, silicon carbide, titanium carbide, zirconium carbide, vanadium carbide, niobium carbide, chromium carbide, tungsten carbide, molybdenum carbide, or tantalum carbide; nitride such as boron nitride, titanium nitride, aluminum nitride, silicon nitride, niobium nitride, or tantalum nitride; boride such as boron, aluminum boride, silicon boride, titanium boride, zirconium boride, vanadium boride, niobium boride, tantalum boride, chromium boride, molybdenum boride, or tungsten boride; the compounds thereof or solid solution of a hypercomplex system; piezo-electric/pyro-electric ceramics such as barium titanate, lead titanate, lithium titanate, strontium titanate, aluminum titanate, PZT or PLZT; Extremely tough ceramics such as SIALON or cermet; living organism adaptable ceramics such as apatite hydroxide or calcium phosphate; metalloid substance such as silicon, germanium or other metalloid in which various kinds of dope substances such as phosphorus were added to silicon or germanium; or semiconductor compounds such as gallium arsenide, indium arsenide or cadmium sulfide.

The structure section of the composite structure according to the present invention can have a thickness of 50 μm or more. The surface of the structure is not smooth microscopically. For example, when an abrasive resistant sliding member coated with an extremely hard ceramic is formed on a metal surface, a smooth surface is required. In this case, it is necessary to cut or grind the surface in a later process. In such a use, it is desirable that the deposition depth of the ceramic structure be about 50 μm or more. When surface grinding is performed, it is desirable that the deposition depth be 50 μm or more due to the mechanical limits of a grinding machine. In this case, since grinding of several tens μm is performed, a thin coat of 50 μm or less with a smooth surface is formed.

In some cases, it is desirable that the thickness of the structure be 500 μm or more. Objects of the present invention are to form not only a ceramic coat which has functions such as high hardness, wear and abrasion resistance, heat resistance, corrosion resistance, chemical resistance, and electrical insulating properties and which is formed on a substrate such as a metallic material, but also to form a structure which can be used alone.

The mechanical strength of the ceramic materials varies, but if the structure has a thickness of 500 µm or more, it is possible to obtain a strength which is suitable, for example, to use as a ceramic substrate if the material is properly selected.

For example, ultra fine ceramic particles are deposited on a surface of metal foil set on a substrate holder to form a compact ceramic structure of which part or all has a thickness of 500 µm or more. After formation of the ceramic structure, if the metal foil section is removed, it is possible to form a machine component of ceramic materials at room temperature.

On the other hand, a composite structure forming method according to the present invention comprises the steps of first pre-treating brittle material fine particles to impart an internal strain to the brittle material fine particles, secondly causing the brittle material fine particles in which the internal strain has been created to collide with a substrate surface at high speed or applying a mechanical impact force to the brittle material fine particles containing the internal strain therein deposited on the substrate surface, to deform or fracture the brittle material fine particles, re-joining the fine particles through active new surfaces generated by the deformation or fracture, forming an anchor section made of polycrystalline brittle material of which part bites into the substrate surface at a boundary section between the new surfaces and the substrate, and further forming a structure made of polycrystalline brittle material on the anchor section.

When the internal strain is small, it is hard to deform or fracture the brittle material fine particles upon collision. On the contrary, when the internal strain is large, a large crack is caused because the internal strain is cancelled. In this case, the brittle material fine particles fracture and cohere before collision. Even though the cohering substance is caused to collide with the substrate, it is hard to form the new surface. Accordingly, to obtain the composite structure according to the present invention, the size and collision speed of the brittle material fine particles are important, but it is more important to apply a predetermined range of internal strain to the brittle material fine particles as raw materials in advance. A strain grows till just before the crack is formed is the most desirable strain, but fine particles in which the internal strain remains are acceptable even though some cracks have been caused therein.

As a technique for colliding the brittle material fine particles at high speed, there is a method using carrier gas, a method for accelerating fine particles using electrostatic force, a thermal spraying method, a cluster ion beam method, a cold spray method and the like. Among these, the method using carrier gas is usually referred to as a gas deposition method. This is the method of forming a structure in which an aerosol including fine particles of metal, metalloid or ceramics is ejected through a nozzle and sprayed on the substrate at high speed, wherein, by providing fine particles on the substrate, a deposited layer such as a green compact having composition of fine particles is formed. In particular, a method for directly forming the structure on the substrate according to the present invention is hereinafter referred to as "Ultra-Fine Particles Beam Deposition Method".

In the composite structure forming method (i.e. ultra-fine particles beam deposition method) according to the present invention, it is preferable to prepare and use in advance brittle material fine-particles of which the average particle size is 0.1~5 µm and the internal strain is large. It is also desirable that the speed be in a range between 50~450 m/s, but it is more preferable if the speed falls between 150~400 m/s. These conditions are closely related to whether or not a newly generated surface is formed upon collision with the substrate. If the particle size is less than 0.1 µm, it is hard to cause fracture or deformation because the size is too small. When the particle size is more than 5 µm, partial fracture is caused, but a trimming effect of the coat by etching substantially starts to appear. There is also some possibility that the fine particles are not fractured, but remain in the deposition of the green compact of the fine particles. Likewise, when the structure is formed in this average particle size, a phenomenon that the green compact is mixed in the structure has been observed if the speed is 50 m/s or less. If the speed is 450 m/s or more, it is known that the etching effect is remarkable and the structure forming efficiency deteriorates.

Once a crack is caused in raw particles, the internal strain is cancelled. It is therefore desirable to have no cracks, but even though there are some cracks, it does not affect the structure forming efficiency so much if there is a predetermined internal strain. In other words, it is most desirable to use the raw fine particles that have stored an internal strain until just before the crack is produced.

As a result of double-checking the contents disclosed in Japanese Unexamined Patent Publication No. 2000-212766, the present inventor et al. could not necessarily get a satisfactory result regarding brittle materials such as ceramics, but there is some possibility that the above-mentioned conditions were not met.

One of the features of a composite structure forming method according to the present invention is in that the composite structure can be formed at room temperature or at a comparatively low temperature and thus the material with a low melting point such as a resin can be selected as the substrate.

However, a heating process can be added to the method according to the present invention. The structure forming of the present invention is characterized in that heat is seldom generated during deformation or fracture of the fine particles and a compact structure can be sufficiently formed at room temperature. Accordingly, formation of the structure does not necessarily involve heat, but heat may be necessary for drying the fine particles, removal of surface adsorbates or activation of the fine particles, or the substrate or structure forming environment may be heated to assist in forming the anchor section, to relax thermal stress between the structure and the substrate with respect to the use environment of the composite structure, to remove adsorbates from the substrate surface, or to improve the structure forming efficiency. Even in this case, it is not necessary to have a temperature so high that the fine particles or the substrate experience dissolution, sintering or extreme softening. After the structure made of polycrystalline brittle material is formed, it is also possible to heat the structure at a temperature lower than the melting point of the brittle material so as to provide structured control of the crystals.

Further, in the composite structure forming method according to the present invention, it is desirable to perform the operation under reduced pressure to allow activation of a new surface formed on the raw fine particles and maintain this state for a certain period of time.

When the composite structure forming method according to the present invention is performed using the ultra-fine particles beam deposition method, it is possible to control the kind and/or partial pressure of the carrier gas to control the deficiency of an element of a compound forming the structure made of the brittle material, to control the concentration of oxygen in the structure, or to form an oxygen deficiency layer of the oxide near the crystalline boundary face in the structure, wherein the electric characteristics, mechanical characteristics, chemical characteristics, optical characteristics and magnetic characteristics of the structure can be controlled.

Namely, when the structure formation is performed using an oxide such as aluminum oxide as the raw fine particles of the ultra-fine particles beam deposition method while controlling the oxygen partial pressure of gas used therein, the fine particles are fractured to form fine fragmentary particles. In this case, it is considered that oxygen exits from the surface of the fine fragmentary particles to a vapor phase to cause a deficiency of oxygen at the surface layer. Then, since the fine fragmentary particles rejoin, an oxygen deficient layer is formed near the boundary face of the crystal grains. The deficient element is not necessarily the oxygen, but may be nitrogen, boron or carbon. This can also be attained by omission of the element by distribution of an element amount between the vapor phase and a solid phase in the non-equilibrium condition or reaction by controlling the partial pressure of a specific gas.

It is possible to control the volume resistivity value, hardness, corrosion resistance, light transmission properties and the like of the ceramic structure by the ultra-fine particles beam deposition method which changes the kind of gas and gas partial pressure stated above. Referring, for example, to the aluminum oxide, when the oxygen gas partial pressure is decreased, an optically clouded structure can be obtained, while when the oxygen gas partial pressure is increased, a transparent structure can be obtained.

In one embodiment of a composite structure forming apparatus according to the present invention, a ceramic structure forming apparatus is provided, in which an aerosol generated by scattering brittle material ultra-fine particles in the gas is ejected and collides with a substrate at high speed to form a structure of ceramic ultra-fine particles, characterized in that the ceramic structure forming apparatus comprises an aerosol generator for generating the aerosol, a nozzle for ejecting the aerosol, and a classifier for classifying the ceramic ultra-fine particles in the aerosol.

In the present invention, it is important to use raw fine particles with internal strain. Accordingly, it is desirable to provide a mill for imparting the internal strain, for example, pre-treatment equipment such as a planetary mill which is a means for imparting a high impact to the fine particles, as a separate body from or as a part of the composite structure forming apparatus.

The brittle material ultra-fine particles are scattered in the gas within the aerosol generator to become an aerosol. The aerosol is transported through a carrier pipe to the classifier in which the aerosol is classified for selection of only particles to be deposited. These fine particles are ejected from the nozzle to the substrate through the carrier pipe at high speed, wherein the fine particles collide with the substrate and are deposited therein to form a ceramic structure. Flow velocity of gas is in a range of subsonic speed to supersonic speed of hundreds to several hundred meters per second. A gas stream can be formed by pressurization using a gas cylinder or an air compressor disposed before the equipment, or by depressurization by a vacuum pump disposed after the equipment, or by a combination thereof. It is also possible to selectively set the absolute pressure and differential pressure within an aerosol-generating chamber and near the substrate by adjusting the inner diameter or length of the carrier pipe.

As described above, secondary particles cohering in the aerosol can not form a compact ceramic structure even though they collide with the substrate. They can only become a green compact. By means of the classifier used in the present invention, coarse secondary particles that prevent formation of the ceramic structure are removed in advance to select only primary particles. The structure can be formed without baking by ejecting only those primary particles that can impart sufficient kinetic energy from the nozzle.

Referring to another embodiment of the composite structure forming apparatus according to the present invention, a composite structure forming apparatus is provided, in which an aerosol generated by scattering brittle material ultra-fine particles in the gas is ejected and collides with a substrate at high speed to form a structure of brittle material ultra-fine particles, characterized in that the composite structure forming apparatus comprises an aerosol generator for generating the aerosol, a nozzle for ejecting the aerosol, and a shredder for shredding cohesion of the brittle material ultra-fine particles in the aerosol (for shredding the brittle material ultra-fine particles cohering in the aerosol, or for preventing cohesion of the brittle material ultra-fine particles in the aerosol). As used herein "shredder" means a disintegrating machine which disintegrates and prevents cohesion of brittle material ultra-fine particles in the aerosol.

The brittle material ultra-fine particles are scattered in the gas within the aerosol generator to become an aerosol, but most of the aerosol forms coarse secondary particles.

Even though the classifier is provided, when the abundance ratio of the secondary particles in the aerosol is remarkably larger than that of the primary particles, the amount of the brittle material ultra-fine particles in the aerosol ejected from the nozzle is very small relative to the amount of ceramic ultra-fine particles in the aerosol generated by the aerosol generator. Accordingly, there is concern that, in practice, the time for forming the ceramic structure becomes longer or the amount of gas consumption becomes enormous.

To counteract the low figure for this powder use coefficient, the aerosol generated by the aerosol generator is transported through the carrier pipe to be introduced to the shredder in which secondary particles are shredded into primary particles. The aerosol of these primary particles is sufficiently accelerated through the carrier pipe to be ejected from the nozzle. The ejected aerosol collides with the substrate to form a compact ceramic structure.

According to a still further embodiment of the present invention, a composite structure forming apparatus is provided, in which aerosol generated by scattering brittle material ultra-fine particles in the gas is ejected and collides with the substrate at high speed to form a structure of brittle material ultra-fine particles, characterized in that the composite structure forming apparatus comprises an aerosol generator for generating the aerosol, a nozzle for ejecting the aerosol, a shredder for shredding cohesion of ceramic ultra-fine particles in the aerosol (or for shredding ceramic ultra-fine particles cohering in the aerosol, or for preventing cohesion of ceramic ultra-fine particles in the aerosol), and a classifier for classifying the brittle material ultra-fine particles in the aerosol.

The brittle material ultra-fine particles are scattered in the gas within the aerosol generator to create an aerosol containing many secondary particles. The aerosol is then introduced into the shredder to be shredded into primary particles. However, even in this case, it is difficult in practice to convert all the secondary particles to primary particles, wherein the primary particles including some secondary particles are guided to the carrier pipe. If coarse secondary particles exist, when the ceramic structure is formed, part of the secondary particles remains non-compacted inside the ceramic structure, adheres to the surface of the structure so that this creates a problem that hinders further formation of the structure, or removes the structure formed.

By providing the classifier after the shredder, it is possible to remove the secondary particles and to eject from the nozzle only the fine primary particles involved in the formation of the ceramic structure.

In one embodiment of the composite structure forming apparatus according to the present invention, a position control means is provided to control the relative position between the substrate and the nozzle.

The substrate is, for example, disposed on a stage which can control the position in the vertical (Z), longitudinal and lateral (XY) directions and at an angle ($\theta$). If the substrate position is moved longitudinally and laterally during formation of the structure, it is possible to form a section of the structure of which the area is larger than the opening of the nozzle. It is also possible to selectively set the deposition thickness by regulating the amount of ceramic ultra-fine particles ejected from the nozzle and a fixed time or travel speed of the substrate. If the position in the vertical direction is controlled following the deposition thickness, it is possible to always make the distance between the nozzle and the ceramic structure constant.

Further, if the nozzle is secured to the end of an arm flexibly movable by computer control or the like and then the deposition operation is performed controlling the position in the vertical (Z), longitudinal and lateral (XY) directions and at an angle ($\theta$) while tracing the surface of an object of a complicate shape having a curved surface and an angle, it is possible to coat an object having a complicated shape with the ceramic structure.

According to one embodiment of an aerosol generator of the present invention, an aerosol generator is provided, which comprises at least one of a container for containing brittle material ultra-fine particles, a vibration device for imparting a mechanical vibration action to the container, and an electric field generating device for applying an electric field, wherein the container is provided with an introduction section for introducing the gas and a guide section for guiding the aerosol.

The brittle material ultra-fine particles are filled into the container as powder. The gas introduced from the introduction section blows up the brittle material ultra-fine particles to generate an aerosol within the container. The aerosol is guided out of the guide section. The introduction section is, for example, tubular-shaped and inserted and embedded in the brittle material ultra-fine particles powder to release gas from the inside of the powder. A mechanical vibration action applied to the container is not only used to impart the kinetic energy for blowing up the ceramic ultra-fine particles, but also has a function of newly providing ambient powder near an opening of the introduction section and of stably generating the aerosol when the introduction section is embedded in the brittle material ultra-fine particles. It is also possible to selectively set the amplitude and vibration speed of a vibration device to suitably adjust the amount of ultra-fine particles that are blown up.

On the other hand, when an electric field is formed around the brittle material ultra-fine particle powder which are filled into the container of dielectric material and are contact-charged using an electric field generating device for applying an alternating voltage or an electric field generating device for generating static electricity by friction, the brittle material ultra-fine particles receive a Coulomb force and float from the container wall surface. The floating brittle material ultra-fine particles enter a gas stream introduced from the introduction section to become an aerosol that is then guided out by the guide section. By regulating the output of the electric field generating device to adjust the strength of the electric field applied, it is possible to suitably control the amount of brittle material ultra-fine particles included in the aerosol. Forcibly setting an electrical charge of the brittle material ultra-fine particles at the charge of one side is also an effective means. In this case, it is also possible to perform the charging treatment in advance or to apply the electrical field together with the charging treatment. For example, if a corona discharge or radioactive rays such as $\gamma$ (gamma) rays are applied to the brittle material ultra-fine particle powder to add or remove electrons, and dc voltage is applied while charging the primary particles, it is possible to float the brittle material ultra-fine particles one after another to form the aerosol and at the same time it is also possible to expect shredding of the secondary particles which have been caused to cohere by the electrostatic force.

According to one embodiment of a classifier of the present invention, the classifier is a guide section of an aerosol generator. Specifically, the classifier is disposed within the aerosol generator. For example, a tubular introduction section is embedded in the powder within the container to blow up the brittle material ultra-fine particles within the container using the aerosol generator constructed above in which a tubular guide section is disposed at the upper section of the container. When the brittle material ultra-fine particles blown up within the container are scattered in the space of the container, the abundance ratio thereof differs in the height direction according to the weight. Comparatively heavy particles like the secondary particles can not rise high, but comparatively light particles like the primary particles can be blown up comparatively high because the influence of gravity on them is small and they are susceptible to the resistance of the gas. Accordingly, by selectively setting the vertical position of the guide section, it is possible to select only the primary particles that are involved in the formation of the ceramic structure. Selected aerosol including the primary particles of which the amount has been adjusted is ejected from the nozzle through the carrier pipe to be deposited on the substrate, thereby forming the compact ceramic structure.

According to another embodiment of the aerosol generator according to the present invention, the container is provided with a sieve and a vibration device for imparting a mechanical vibration action to the container. For example, in this aerosol generator, the sieve is disposed at the upper section of the container and the brittle material ultra-fine particle powder is filled into this sieve. The brittle material ultra-fine particles to which mechanical vibration has been applied by the vibration device are passed through the openings of the sieve, whereby only the brittle material ultra-fine particles which are smaller than the diameter of the sieve openings pass by their own gravity. The passed brittle material ultra-fine particles enter the gas stream flowing between the introduction section and the guide section disposed at the lower section of the container and become an aerosol. The aerosol is then guided out of the guide section. By adjusting the opening diameter and opening area of the sieve and by adjusting the amplitude and vibration speed of the vibration device, there is an advantage that the maximum size and amount of the passed brittle material ultra-fine particles can be adjusted to generate and provide a stable aerosol. When the aerosol is ejected from the nozzle toward the substrate for deposition, the ceramic structure forming apparatus provided with such an aerosol generator is suitable for moving the substrate longitudinally and laterally at a fixed speed to obtain a ceramic structure with a fixed deposition thickness.

According to one embodiment of a shredder according to the present invention, the shredder is provided with an introduction section and a guide section for introducing and guiding the aerosol respectively, and an impact plate against which the aerosol collides, wherein the aerosol collides with the impact plate at a lower speed than that for forming a structure of the ceramic ultra-fine particles, to shred the ultra-fine particles which are in a coarse, cohering condition. As described above, the brittle material ultra-fine particles exist as secondary particles of almost cohering particles, but the aerosol, containing the secondary particles generated by the aerosol generator, is introduced as a jet-shaped aerosol stream accelerated by the introduction section of the shredder to collide with the impact plate provided on the downstream side. The speed of the brittle material ultra-fine particles in the aerosol stream at this time is preferably 200 m or less per second. The colliding secondary particles are shredded upon impact to become minute particles (i.e. primary particles) which again enter the gas stream after reflecting and, as a result, they are converted to an aerosol containing many primary particles. This aerosol containing many primary particles is suitable for forming a compact ceramic structure.

If the angle of the impact plate is set at 30~60 degrees relative to the travel direction of the aerosol stream introduced, the direction of the reflection of particles can be easily and suitably set. In particular, when the direction of reflection is set in the opposite direction to a gravity vector, it is possible to control movement of the brittle material ultra-fine particles in the space after reflection by selectively setting the speed of the colliding brittle material ultra-fine particles and the pressure within the shredder. For example, if the guide section is provided at a higher location than the impact plate, it is easy to apply a classification action to the shredder by using the height of travel.

In the composite structure forming apparatus according to the present invention, it is possible to selectively control the pressure within the apparatus from a vacuum to a range of more than atmospheric pressure using a gas cylinder or an air compressor disposed on the upstream side and a vacuum pump disposed on the downstream side. For example, if the pressure within the shredder is controlled in a range from 100 Pa to atmospheric pressure, it is possible to precisely set the direction of reflection of the brittle material ultra-fine particles and to expect improvement in the use efficiency of the fine particles and compactness of the shredder. If the pressure within the shredder is controlled at more than atmospheric pressure, the brittle material ultra-fine particles are susceptible to the resistance of the gas and it is possible to expect improvement in the classification effect.

According to another embodiment of the shredder according to the present invention, the shredder is provided with a plurality of introduction sections, wherein a plurality of aerosol streams ejected from these introduction sections is caused to collide with one another for shredding.

The aerosol including the secondary particles generated by the aerosol generator is introduced as a jet-shaped aerosol stream accelerated by the plurality of introduction sections of the shredder, wherein these aerosol streams collide with one another to impart an impact to the secondary particles included for shredding. In this manner, the aerosol including the secondary particles is converted to an aerosol containing many primary particles. The aerosol including many primary particles is suitable for forming a compact ceramic structure.

According to a still further embodiment of the shredder according to the present invention, the shredder is arranged to irradiate the aerosol with ultrasonic waves and/or microwaves. For example, an ultrasonic wave irradiation section is disposed in the middle of a tubular carrier pipe that communicates from the aerosol generator to the nozzle to irradiate the aerosol containing many secondary particles with the ultrasonic waves. The ultrasonic waves are electrically generated by a piezoelectric resonator and amplified using an ultrasonic wave horn that is a resonator, wherein the ultrasonic waves are transmitted to the ultrasonic wave irradiation section and irradiate the aerosol. The secondary particles in the aerosol are shredded by the mechanical micro-vibration of the ultrasonic wave and converted to primary particles. The aerosol including many primary particles is suitable for forming a compact ceramic structure.

On the other hand, one of the factors by which the brittle material ultra-fine particles cohere to form coarse secondary particles is cohesion of the particles by water. Accordingly, if a microwave generator is disposed in the middle of the carrier pipe to generate microwaves of which the vibration frequency used in high-frequency dielectric heating of water is 2450 MHz or so to irradiate the aerosol, water in the secondary particles is heated and constantly evaporated. In this manner, it is possible to remove the factor of cohesion and shredding of the secondary particles to form primary particles can be attained. The aerosol containing many primary particles is suitable for forming a compact ceramic structure.

The shredders described above can be combined to increase the effect.

BRIEF DESCRIPTION OF THE DRAWINGS

The above and other objects, features and advantages of the present invention will become more apparent from the following description when taken in conjunction with the accompanying drawings.

DETAILED DESCRIPTION OF THE ILLUSTRATIVE EMBODIMENTS

Illustrative embodiments of the present invention will now be described with reference to the accompanying drawings.

First Embodiment

Figure 1:
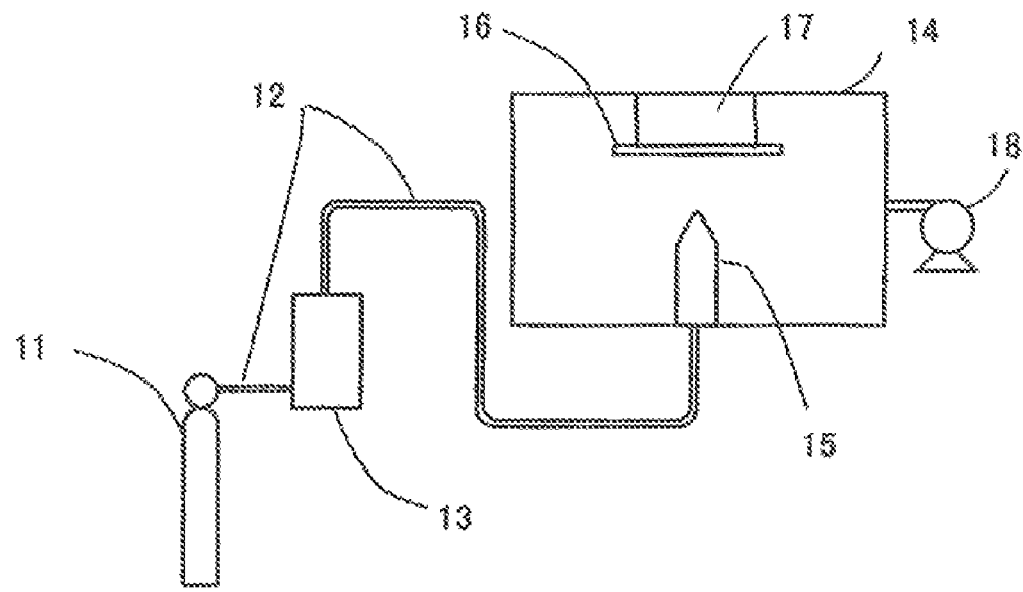
FIG. 1 is a view explaining a first embodiment of a composite structure forming apparatus.

FIG. 1 is a view showing a first embodiment of a composite structure forming apparatus. A helium gas cylinder 11 is connected to an aerosol generator 13 through a carrier pipe 12 and a nozzle 15 with a rectangular opening of 5 mm×0.5 mm is disposed within a structure-forming chamber 14 through the carrier pipe. A tabular substrate 16 made of metal aluminum (Al) is mounted facing the nozzle on a substrate holder 17 which is controllable by a computer vertically (Z) and longitudinally and laterally (XY) 10 mm from the nozzle 15. The structure-forming chamber 14 is connected to an exhaust pump 18.

In the present invention, since raw fine particles with internal strain are used, a planetary grinder or a mill serving as pre-treatment equipment for imparting the internal strain to the raw fine particles is arranged next to the aerosol generator 13 or the like. However, it is also possible to convey the raw fine particles that have been pre-treated in a different location to be used here.

Figure 2:
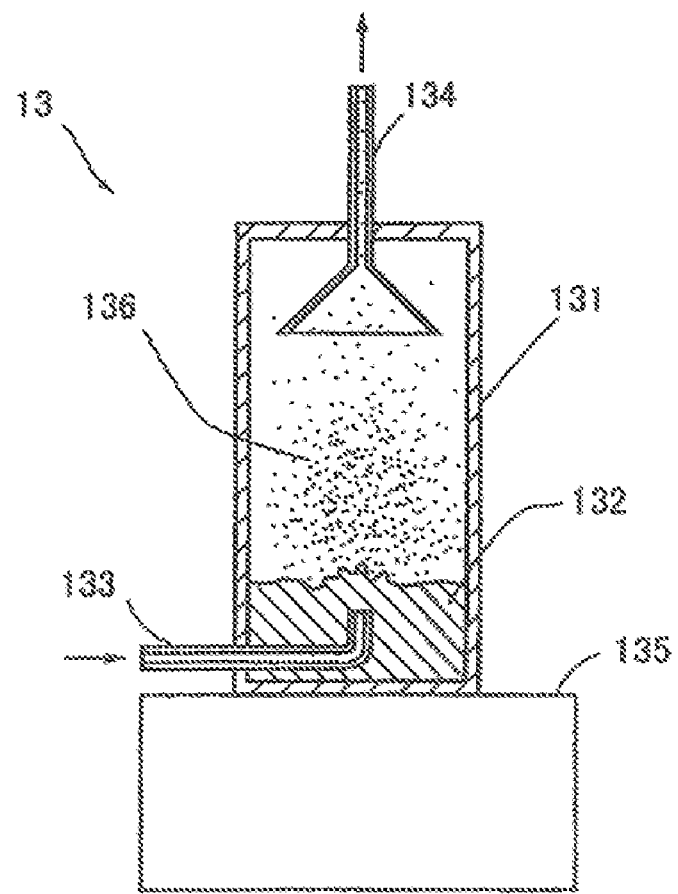
FIG. 2 is a schematic cross-sectional view of an aerosol generator of the composite structure forming apparatus.

FIG. 2 is a schematic cross-sectional view of the aerosol generator 13 used in the first embodiment. The aerosol generator 13 is provided with a container 131 which stores a ceramic ultra-fine particle powder 132 of aluminum oxide ($Al_2O_3$) of which the average primary particle size is 0.5 µm. Adsorbed water on the ceramic ultra-fine particle powder has been sufficiently removed in advance by vacuum drying. An introduction section 133 connected to the carrier pipe 12 not shown in FIG. 2 is embedded in the ceramic ultra-fine particle powder 132. A guide section 134 that can slide vertically is disposed at the upper section of the container 131 and connected to the carrier pipe 12 not shown in FIG. 2. A vibrator 135 imparting a mechanical vibration action is connected to the container 131. An arrow in the figure shows the direction in which gas and aerosol 136 flow.

Operation of the above ceramic structure forming apparatus will now be described. A gas cylinder 11 is opened so that gaseous helium is introduced from the introduction section 133 of the aerosol generator 13 through the carrier pipe 12 at a flow rate of 2.5 liter/minute. As a result, the ceramic ultra-fine particle powder 132 with the internal strain is blown up within the container 132 to generate the aerosol 136. In this case, since the ceramic ultra-fine particle powder 132 is continuously supplied near an opening of the introduction section 133 by the mechanical vibration action of the vibrator 135, the aerosol 136 can be stably generated. The ceramic ultra-fine particles in the aerosol 136 which have cohered to form secondary particles can not move upward to any great extent because they are comparatively heavy. On the contrary, primary particles of low weight or comparatively small particles close to the primary particles can move upward to the upper part of the container. Accordingly, if the guide section 134 is selectively set to slide so that its position in the vertical direction can be changed, it serves as a classifier which can select ceramic ultra-fine particles of the desired particle size and guide them out of the container 131. The guided aerosol 136 is ejected from the nozzle 15 through the carrier pipe 12 toward the substrate 16 at high speed. The ejection speed of the aerosol 136 is controlled by the shape of the nozzle 15, the length and inner diameter of the carrier pipe 12, the pressure in the gas cylinder 11, the cylinder capacity of the exhaust pump 18 or the like. With these controls, for example, if the internal pressure of the aerosol generator 13 is set at several tens of thousands Pa and the internal pressure of the structure forming chamber 14 is set at several hundred Pa to provide differential pressure, the ejection speed can be accelerated from subsonic to a supersonic range. The ceramic ultra-fine particles in the aerosol 136 which have been sufficiently accelerated to build up kinetic energy collide with the substrate 16 and are fractured into pieces by the impact energy, whereby these minute fragmentary particles adhere to the substrate or join together to form a compact ceramic structure. The substrate 16 is provided with a reciprocating motion of 5 mm longitudinally by the substrate holder 17 during the structure forming operation, for 10 minutes. With this control, it is possible to form a ceramic structure of aluminum oxide of which the deposition thickness is about 50 µm. Further, if the structure forming time is extended, it is possible to increase the deposition thickness in proportion to the time elapsed. Since this ceramic structure has almost the same hardness as a baked body, it is not necessary to further bake it by an additional heating operation or the like.

Second Embodiment

Figure 3:
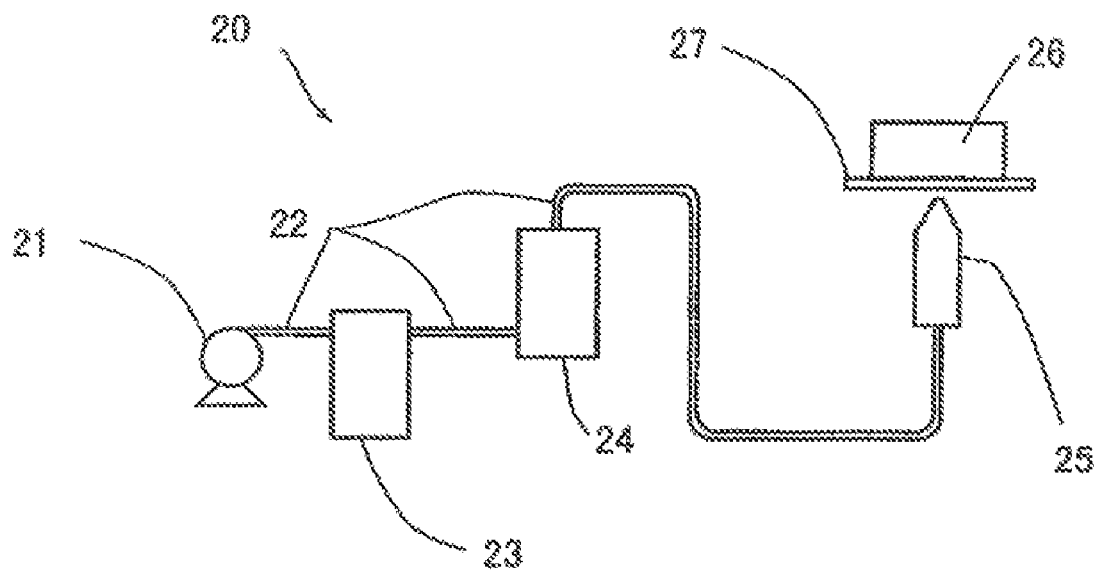
FIG. 3 is a view explaining a second embodiment of a composite structure forming apparatus.

FIG. 3 is a view showing a second embodiment of a composite structure forming apparatus. In a composite structure forming apparatus 20, an air compressor 21 for providing compressed air is connected to an aerosol generator 23 through a carrier pipe 22. Provided on the downstream side of the aerosol generator 23 is a shredder 24 which is connected to a nozzle 25 with a rectangular opening of 10 mm×0.5 mm. Under atmospheric pressure, a substrate 27 of metal aluminum (Al) is mounted facing the nozzle 25 on a substrate holder 26 which is movable vertically (Z) and longitudinally and laterally (XY) at intervals of 2 mm from the end of the nozzle 25.

Figure 4:
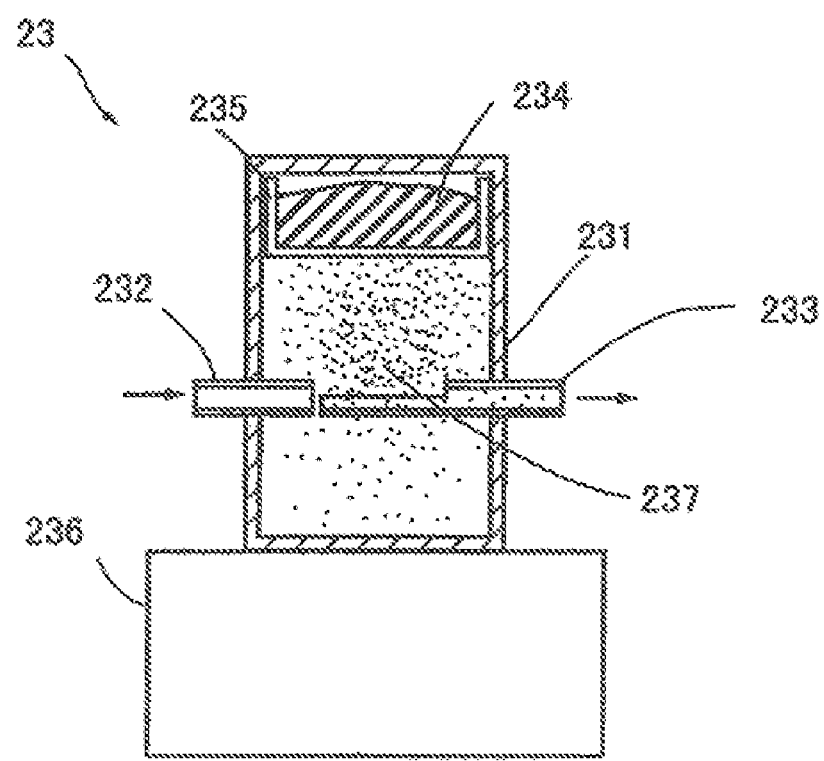
FIG. 4 is a schematic cross-sectional view of an aerosol generator of the composite structure forming apparatus according to the second embodiment.

FIG. 4 is a schematic cross-sectional view of the aerosol generator 23 used in the second embodiment. An introduction section 232 connected to the carrier pipe 22 not shown in FIG. 4 is disposed on a level with a guide section 233 connected to the carrier pipe 22, not shown in the figure, relative to a container 231. Provided above the introduction section 232 and the guide section 233 is a sieve 235 with an opening diameter of 100 µm into which is disposed a ceramic ultra-fine particle powder 234 of aluminum oxide ($Al_2O_3$) of which the average primary particle size is 0.5 µm and of which the adsorbed water has been sufficiently removed in advance by vacuum drying. The container 231 is connected to a vibrator 236 which is adapted to impart a mechanical vibration action thereto.

Figure 5:
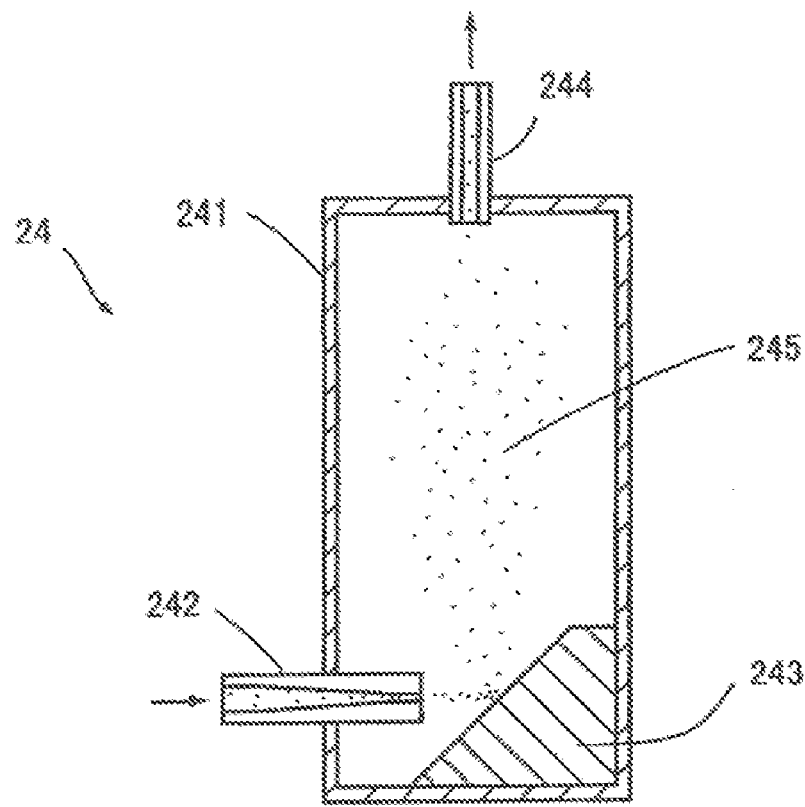
FIG. 5 is a schematic cross-sectional view of a shredder of the composite structure forming apparatus according to the second embodiment.

FIG. 5 is a schematic cross-sectional view of the shredder 24 used in the second embodiment. A tubular introduction section 242 connected to the carrier pipe 22 not shown in FIG. 5 is disposed at the lower section of a container 241 and an impact plate 243 is disposed on the downstream side of the introduction section 242 at an angle of 45 degrees relative to the introduction direction of the aerosol. Disposed above the impact plate 243 is a vertically slidable guide section 244 connected to the carrier pipe 22 not shown in FIG. 5. An arrow in the figure shows the direction in which the aerosol 245 flows.

Operation of the above ceramic structure forming apparatus 20 will now be described. The air compressor 21 is activated to compress air. The compressed air is introduced from the introduction section 232 of the aerosol generator 23 through the carrier pipe 22 at a flow rate of 15 liters/minute. A gas stream is formed between the introduction section 232 and the guide section 233 disposed on the downstream side of the introduction section 232 in parallel therewith. The container 231 is caused to vibrate by the vibrator 236 to pass the ceramic ultra-fine particles of a size of 100 μm or less through a sieve 235 in which the ceramic ultra-fine particle powder 234 has been accommodated. The ceramic ultra-fine particles enter the gas stream to become an aerosol 237 containing many secondary particles. The aerosol 237 is then introduced into the shredder 24 through the carrier pipe 22. Since the introduction section 242 of the shredder 24 is provided with a reduced opening, the aerosol 237 collides with the impact plate 243 under jet conditions, wherein the secondary particles included in the aerosol 237 are fractured to primary particles or particles of a size close to that of the primary particles and reflected as the aerosol 245 and blown to the upper section of the container 241. If the guide section 244 is slid to selectively set the position in the vertical direction, it can serve as the classifier for selecting and guiding the ceramic ultra-fine particles with the desired size.

The aerosol 245 containing many primary particles guided out of the shredder 24 is ejected toward the substrate 27 from the nozzle 25 at high speed. The ejection speed of the aerosol is controlled in a range from subsonic to supersonic by the amount of gas flow from the air compressor 21. The ceramic ultra-fine particles in the aerosol which have been accelerated to develop sufficient kinetic energy collide with the substrate 27 and are fractured into pieces by the energy of impact. These minute fragmentary particles adhere to the substrate or join together to form the compact ceramic structure of aluminum oxide. Deposition thickness of the ceramic structure formed by the operation described above is about 0.5 μm/minute and it increases in proportion to time elapsed. Further, if the substrate holder 26 is selectively activated to move the substrate 27, the desired shaped ceramic structure can be formed.

Third Embodiment

Figure 6:
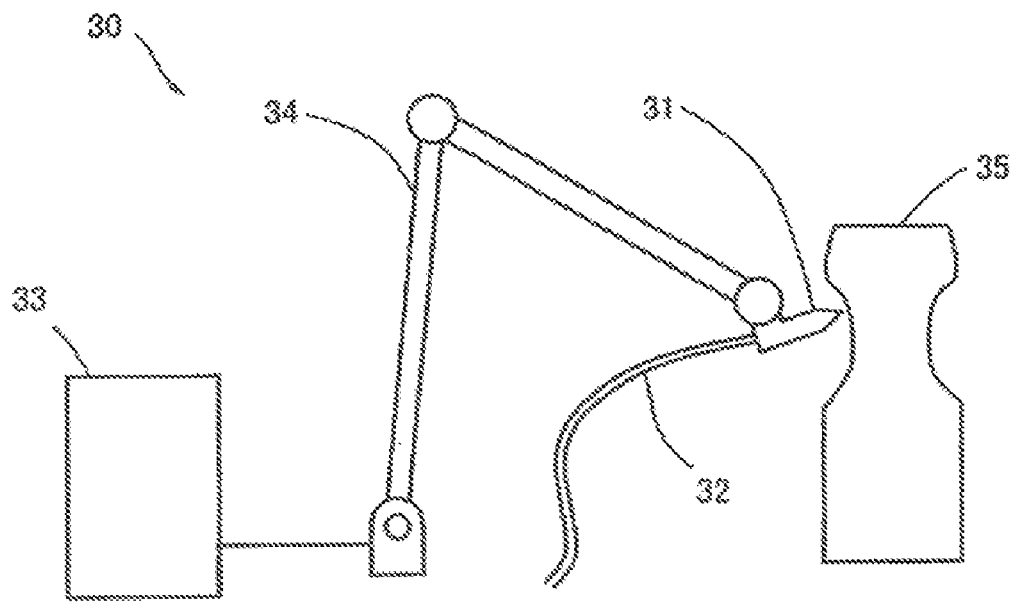
FIG. 6 is a view explaining a third embodiment of a composite structure forming apparatus.

FIG. 6 is a view showing a third embodiment of a composite structure forming apparatus. A nozzle 31 of the composite structure forming apparatus 30 is connected to an aerosol generator not shown in the figure through a carrier pipe 32 made of a flexible material. The nozzle 31 is held by an end of a flexibly movable arm 34 which is controlled by a computer 33 to face a complicatedly shaped object 35 such as a substrate.

Operation of the above ceramic structure forming apparatus 30 will now be described. The ceramic ultra-fine particles are conveyed from an aerosol generator not shown in the figure through the carrier pipe 32 and ejected onto the surface of the complicatedly shaped object 35 from the nozzle 31 at high speed for deposition. The movable arm 34 is controlled by the computer 33 to trace the surface, i.e., a profile, of the complicatedly shaped object 35 to be coated by the ceramic structure moving at a fixed distance from the surface of the object. In this manner, the ceramic structure of a uniform deposition thickness is coated on the surface of the complicatedly shaped object.

Fourth Embodiment

Figure 7:
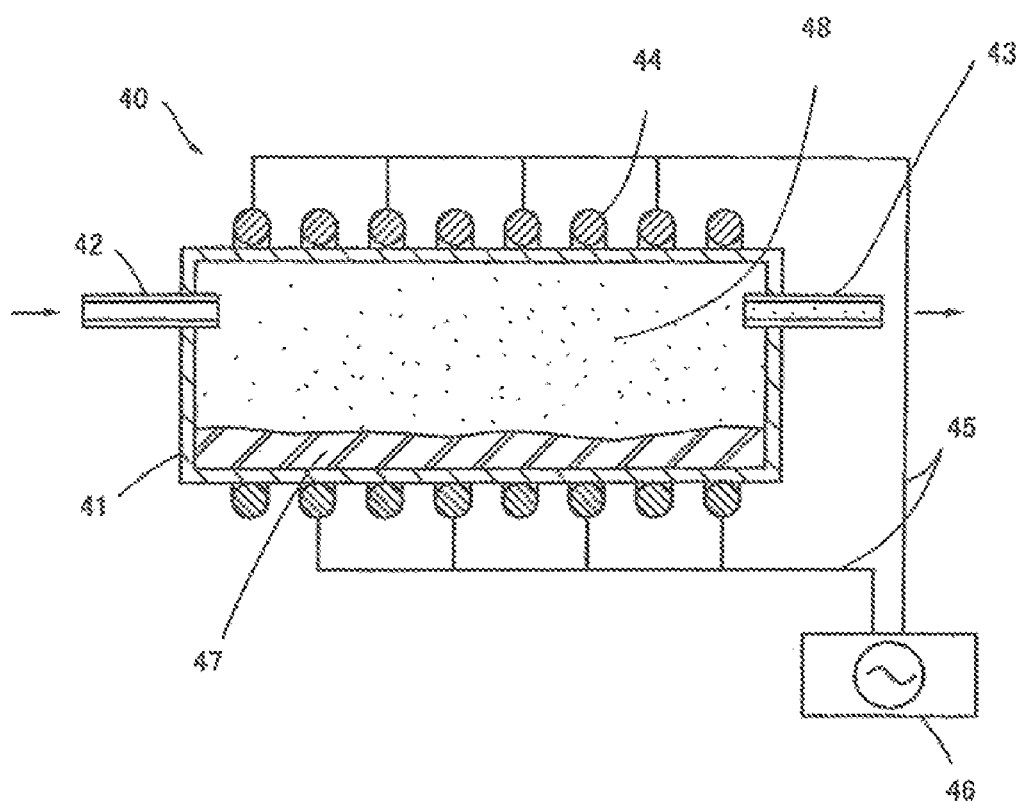
FIG. 7 is a schematic cross-sectional view of an aerosol generator according to a fourth embodiment.

FIG. 7 is a schematic cross-sectional view of an aerosol generator 40 according to a fourth embodiment used in a composite structure forming apparatus. An introduction section 42 and a guide section 43 connected to a carrier pipe not shown in the figure are secured to a container 41 made of Teflon material. A plurality of torus electrodes 44 serving as electric field generating device is disposed around the container 41 leaving a space therebetween. The electrodes 44 are connected to an AC power supply 46 through lead wires 45. Accommodated within the container 41 is a ceramic ultra-fine particle powder 47 of aluminum oxide ($Al_2O_3$). An arrow in the figure shows the direction in which gas and aerosol flow.

Operation of the above aerosol generator 40 will now be described. In the case of aluminum oxide or the like with high electrical resistance, the ultra-fine particles are charged bipolarly in many cases by mutual contact-charging of particles under natural conditions. If the AC power source 46 is switched ON to apply alternating voltage between the electrodes 44 and to generate a strong electric field around the powder, the ceramic ultra-fine particle powder 47 receives a Coulomb force according to its charge and the particles float in the container 41. In this condition, if gas is introduced from the introduction section 42 through the carrier pipe not shown in the figure, the ceramic ultra-fine particle powder 47 becomes an aerosol 48 which is then guided out of the guide section 43. By selectively setting the field intensity generated in the container 41, it is possible to control the amount of floating ceramic ultra-fine particles. Accordingly, it is easy to set the aerosol 48 at the desired concentration.

Fifth Embodiment

Figure 8:
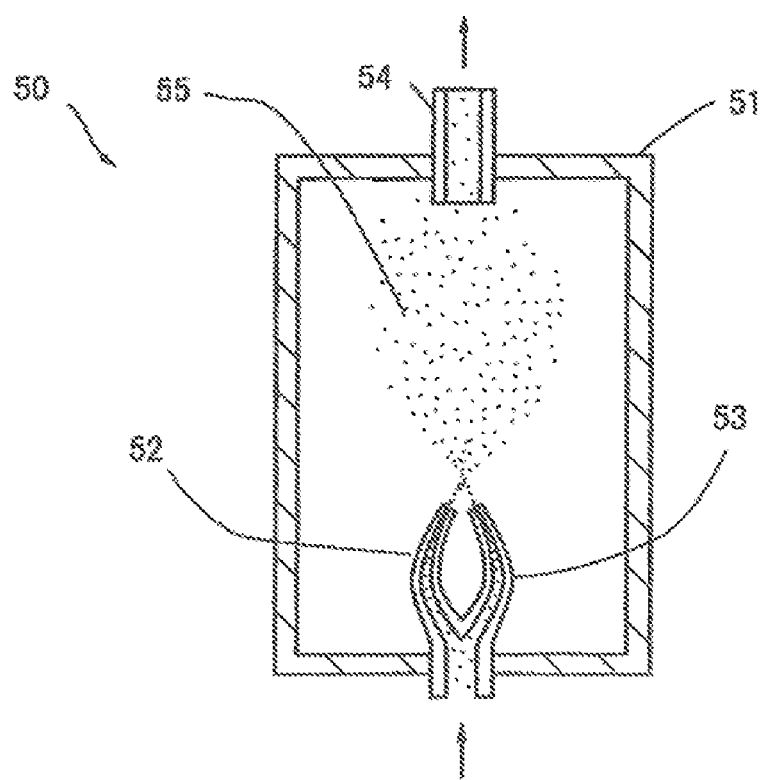
FIG. 8 is a schematic cross-sectional view of a shredder according to a fifth embodiment.

FIG. 8 is a schematic cross-sectional view of a shredder 50 according to a fifth embodiment used in a composite structure forming apparatus. An introduction section 52 and an introduction section 53 connected to a carrier pipe, not shown in the figure, are disposed at the lower section of a container 51 to allow the extension of the lines from the introduction sections 52, 53 in the introduction direction of the common aerosol to intersect. A vertically slidable guide section 54 is disposed at the upper section of the container 51 and connected to the carrier pipe not shown in the figure. An arrow in the figure shows the direction in which the aerosol flows.

Operation of the above shredder 50 will now be described. The aerosol 55 conveyed from the carrier pipe is first divided by the introduction sections 52 and 53 and introduced into the container 51 in a jet condition for collision. In this case, secondary particles of the ceramic ultra-fine particles collide with one another and are fractured. They are then converted to primary particles or particles of which the size is close to that of primary particles. After this, the aerosol 55 is blown up within the container 51. If the guide section 54 is slid to selectively set the position in the vertical direction, it serves as a classifier that can select and guide the ceramic ultra-fine particles of the desired size.

Sixth Embodiment

Figure 9:
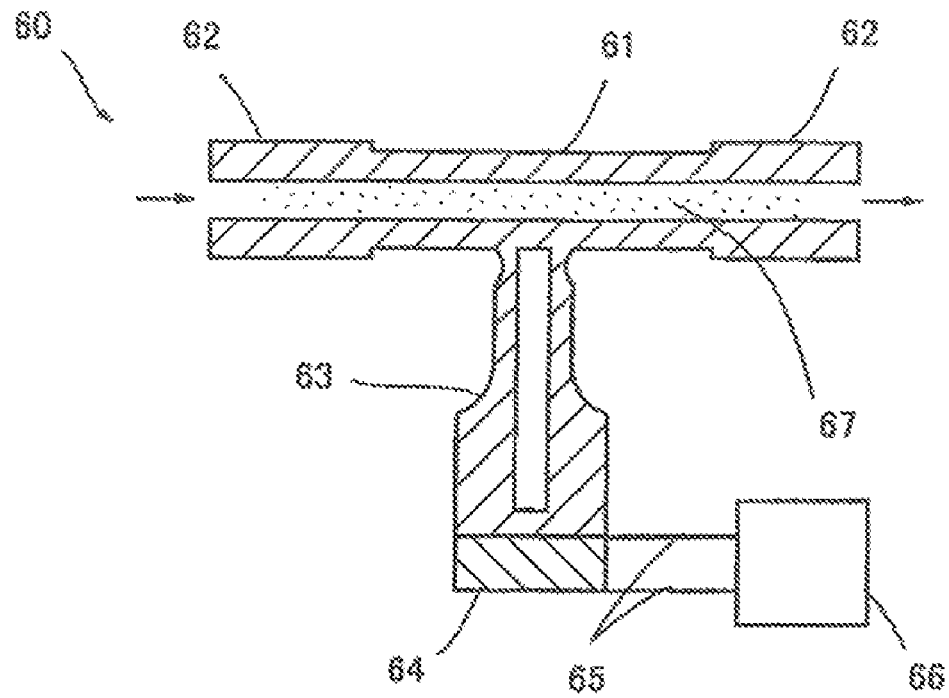
FIG. 9 is a schematic cross-sectional view of a shredder according to a sixth embodiment.

FIG. 9 is a schematic cross-sectional view of a shredder 60 according to a sixth embodiment used in a composite structure forming apparatus. A tubular ultrasonic irradiation section 61 is disposed in the middle of a carrier pipe 62 and connected to a piezoelectric vibrator 64 through an ultrasonic horn 63. The piezoelectric vibrator 64 is connected to an ultrasonic oscillator 66 through lead wires 65. The ultrasonic oscillator 66 is then connected to a power supply not shown in the figure. An arrow in the figure shows the direction in which the aerosol flows.

Operation of the above shredder 60 will be described hereunder. The ultrasonic oscillator 66 oscillates the piezoelectric vibrator 64 to generate high frequency ultrasonic waves. The high frequency ultrasonic waves are amplified by the ultrasonic wave horn 63 and propagated to the ultrasonic wave irradiation section 61, wherein the high frequency ultrasonic waves converge toward the center of a tube and are applied at a high acoustic pressure. The aerosol 67 is introduced through the carrier pipe 62 to the ultrasonic wave irradiation section 61, wherein secondary particles contained in the aerosol are subjected to micro-vibration by high frequency ultrasonic waves and fractured into primary particles or particles of a size close to that of primary particles. Since the ultrasonic wave in the air can be propagated easier without appreciably damping the acoustic pressure level if the gas pressure is higher, it is desirable to set the gas pressure of the aerosol 67 at more than atmospheric pressure to improve the shredding efficiency.

Seventh Embodiment

Figure 10:
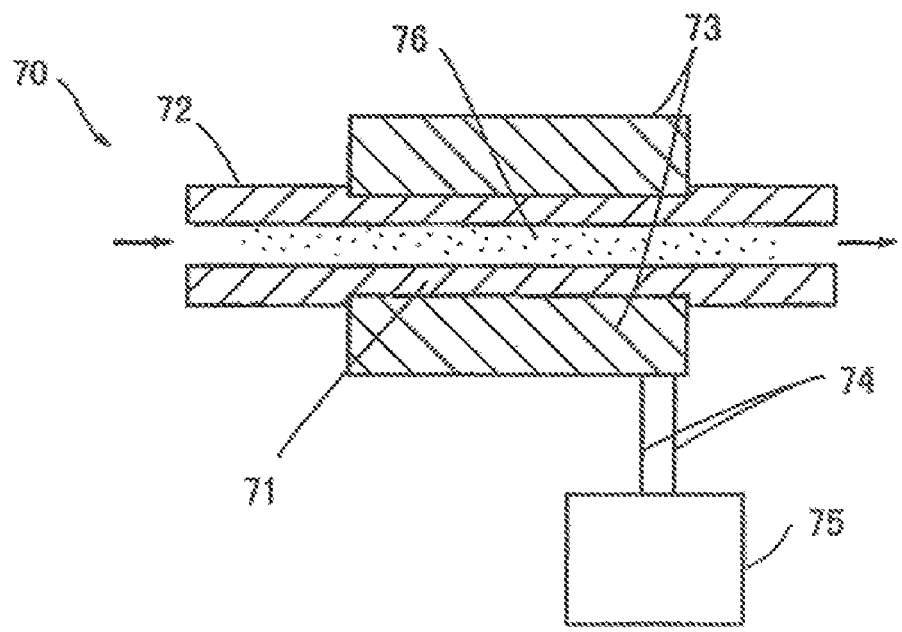
FIG. 10 is a schematic cross-sectional view of a shredder according to a seventh embodiment.

FIG. 10 is a schematic cross-sectional view of a shredder 70 according to a seventh embodiment used in a composite structure forming apparatus. A tubular microwave irradiation section 71 is disposed in the middle of a carrier pipe 72. A microwave oscillator 73 is disposed to surround the microwave irradiation section 71 and is connected to a power source 75 through lead wires 74.

Operation of the above shredder 70 will now be described. When the power source 75 is switched ON, the microwave oscillator 73 oscillates to form microwaves of a frequency of 2450 MHz. An aerosol 76 is introduced by the carrier pipe 72 to the microwave irradiation section 71 where the microwaves are applied. Water which is included in the secondary particles contained in the aerosol 76 and is a polar molecule which is a primary factor causing cohesion is heated by a dielectric loss of the microwave irradiation and instantaneously evaporates. Accordingly, the primary particles desorb and are fractured.

Eighth Embodiment

Figure 11:
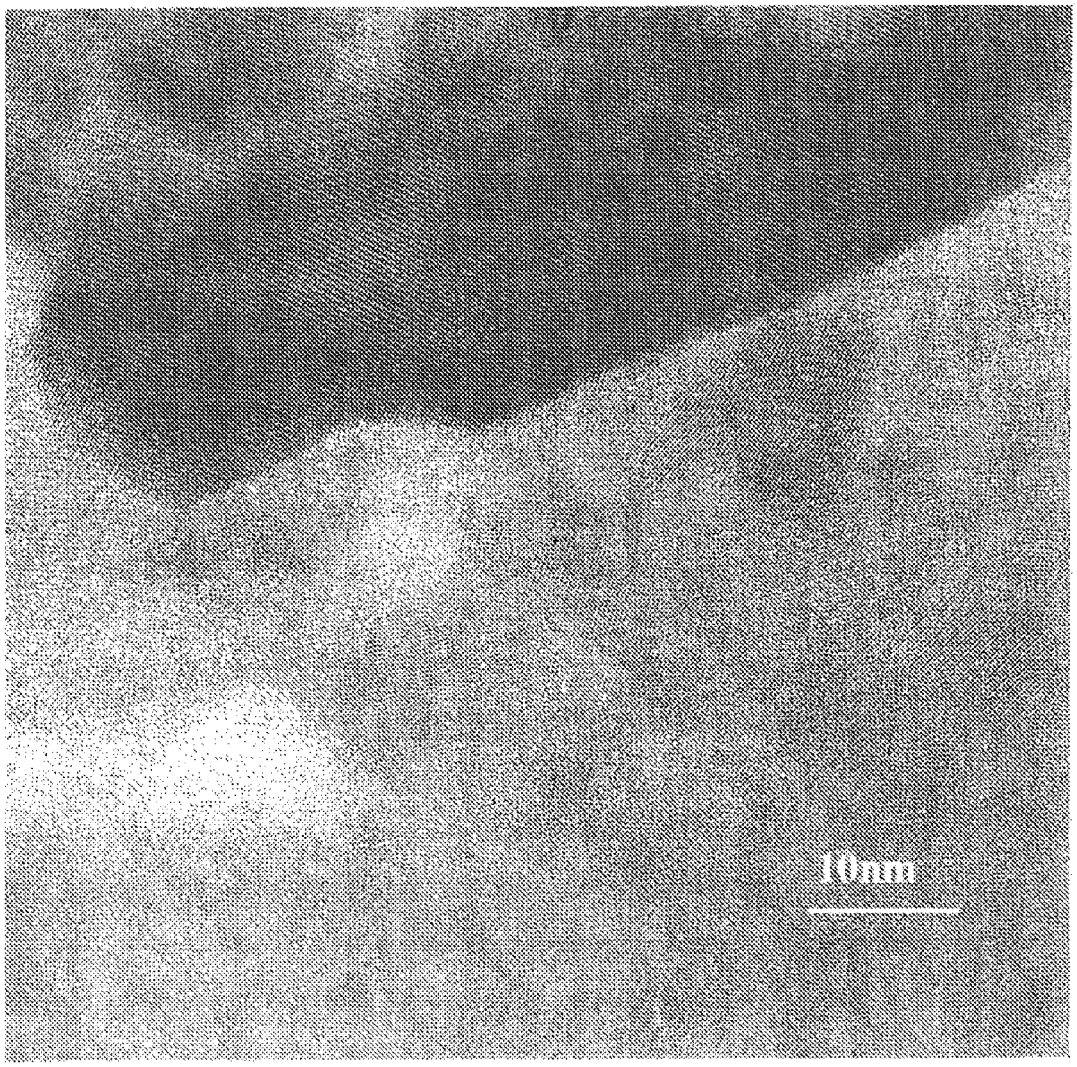
FIG. 11 is a TEM image of a titanic acid lead zirconate (PZT) structure.
Figure 12:
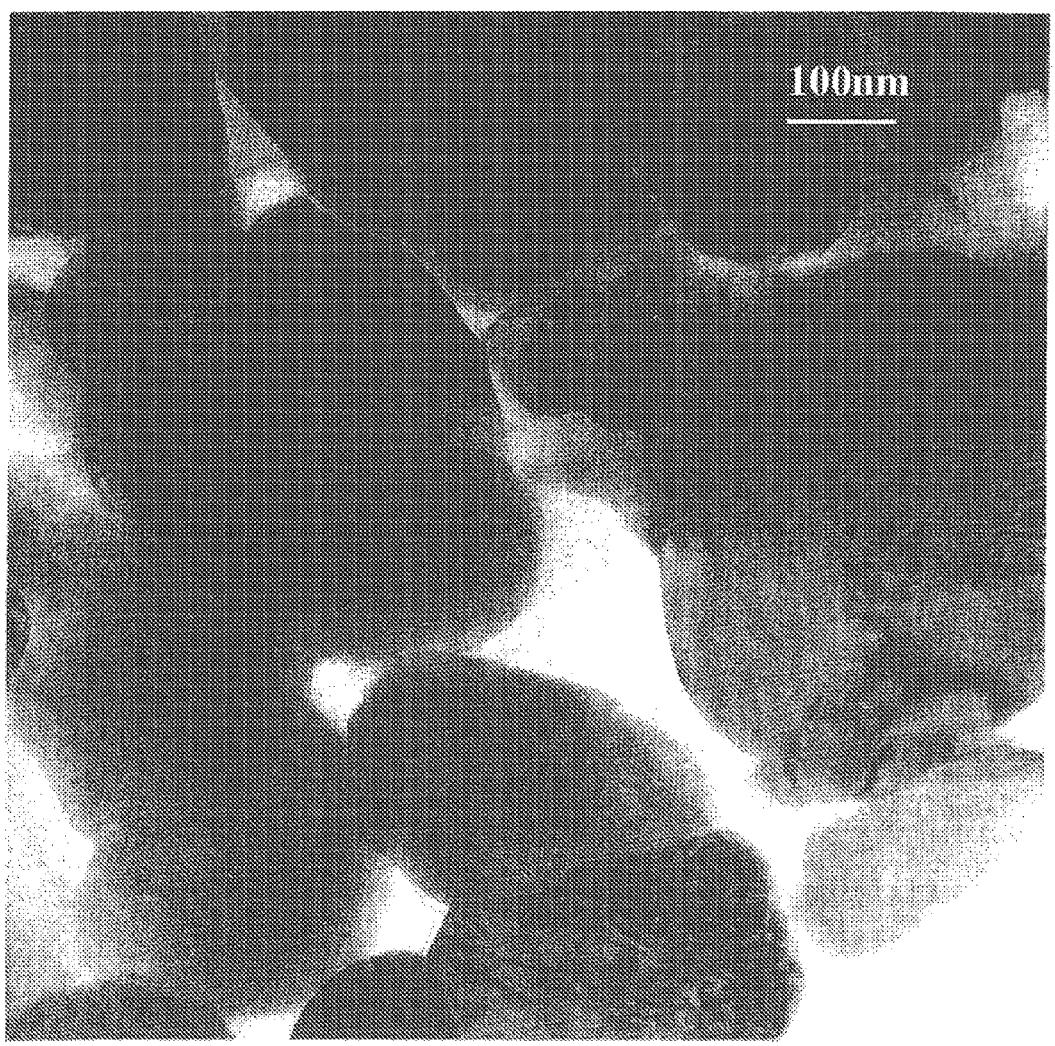
FIG. 12 is a TEM image of raw particles of the PZT.
Figure 13:
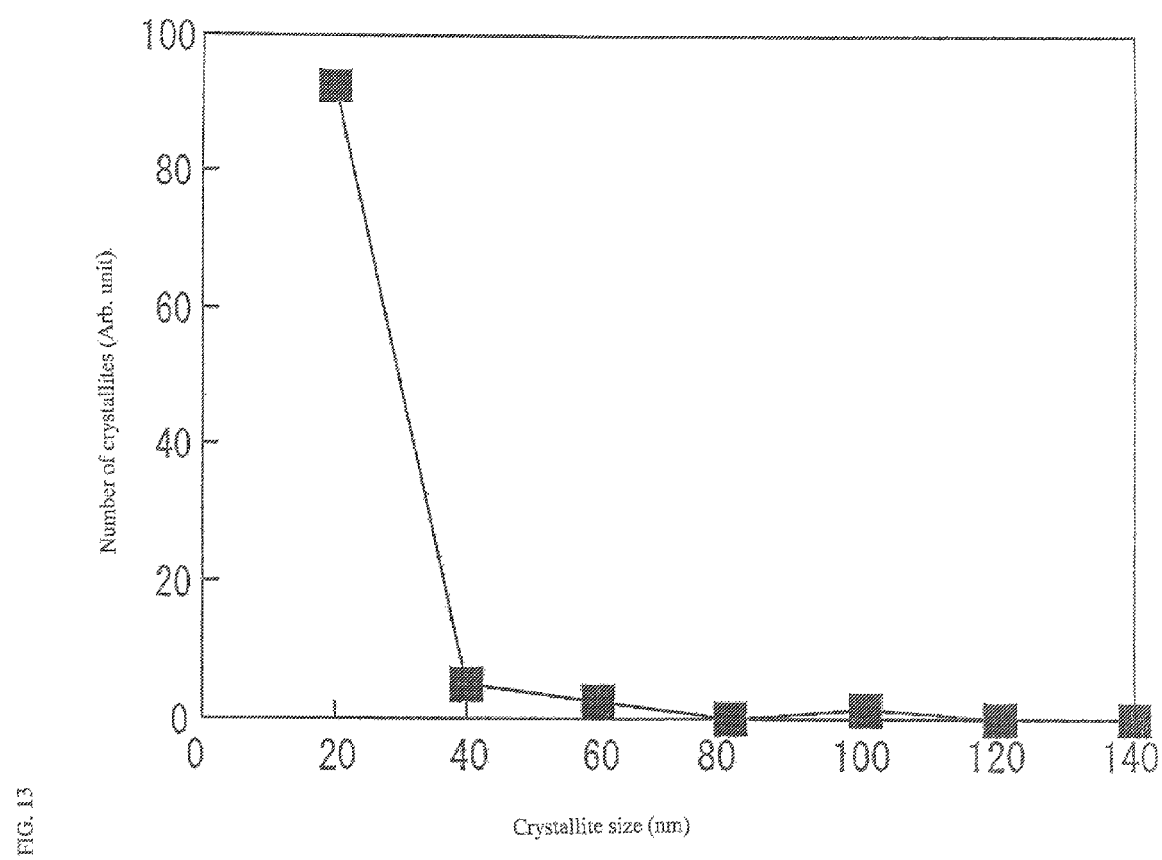
FIG. 13 is a distribution chart of crystallite size in a structure measured from the TEM image.
Figure 14:
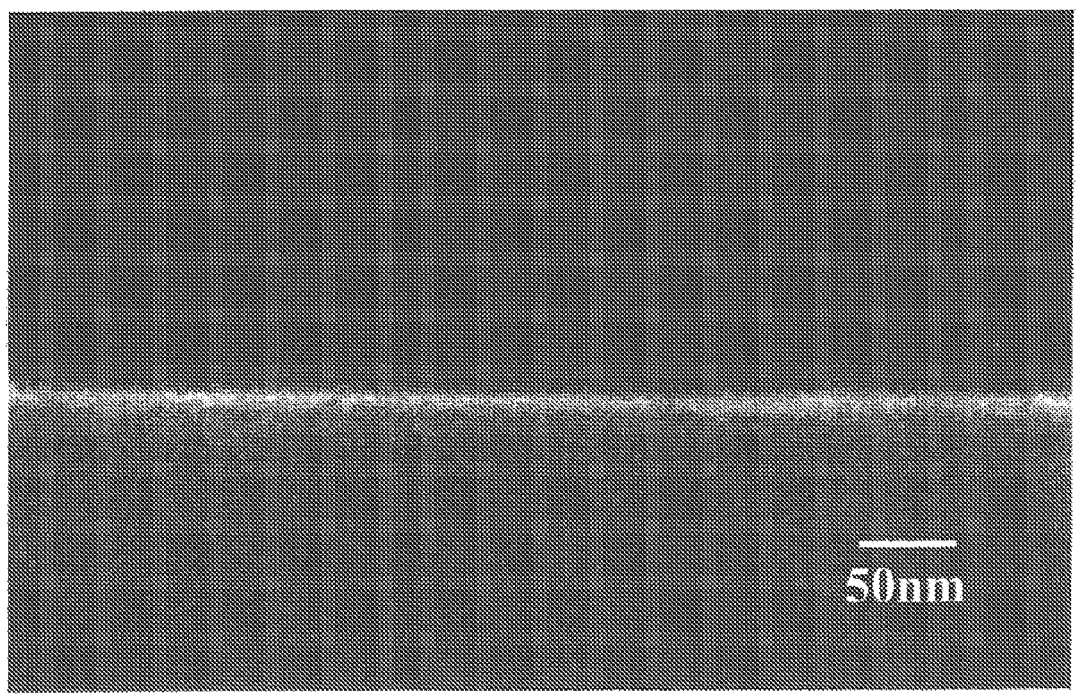
FIG. 14 is a SEM image of a silicon oxide substrate before the titanic acid lead zirconate (PZT) structure is formed.
Figure 15:
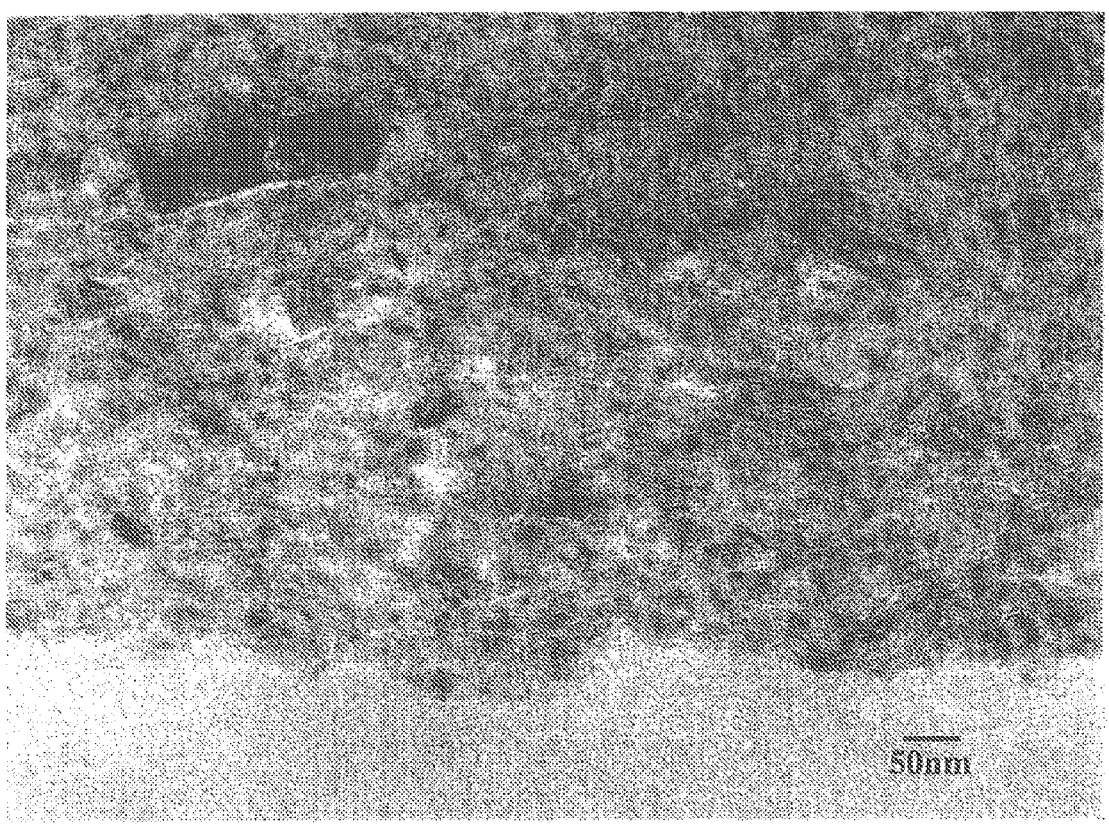
FIG. 15 is a TEM image of a boundary section between the titanic acid lead zirconate (PZT) structure and the silicon oxide substrate after the titanic acid lead zirconate (PZT) is formed.
Figure 16:
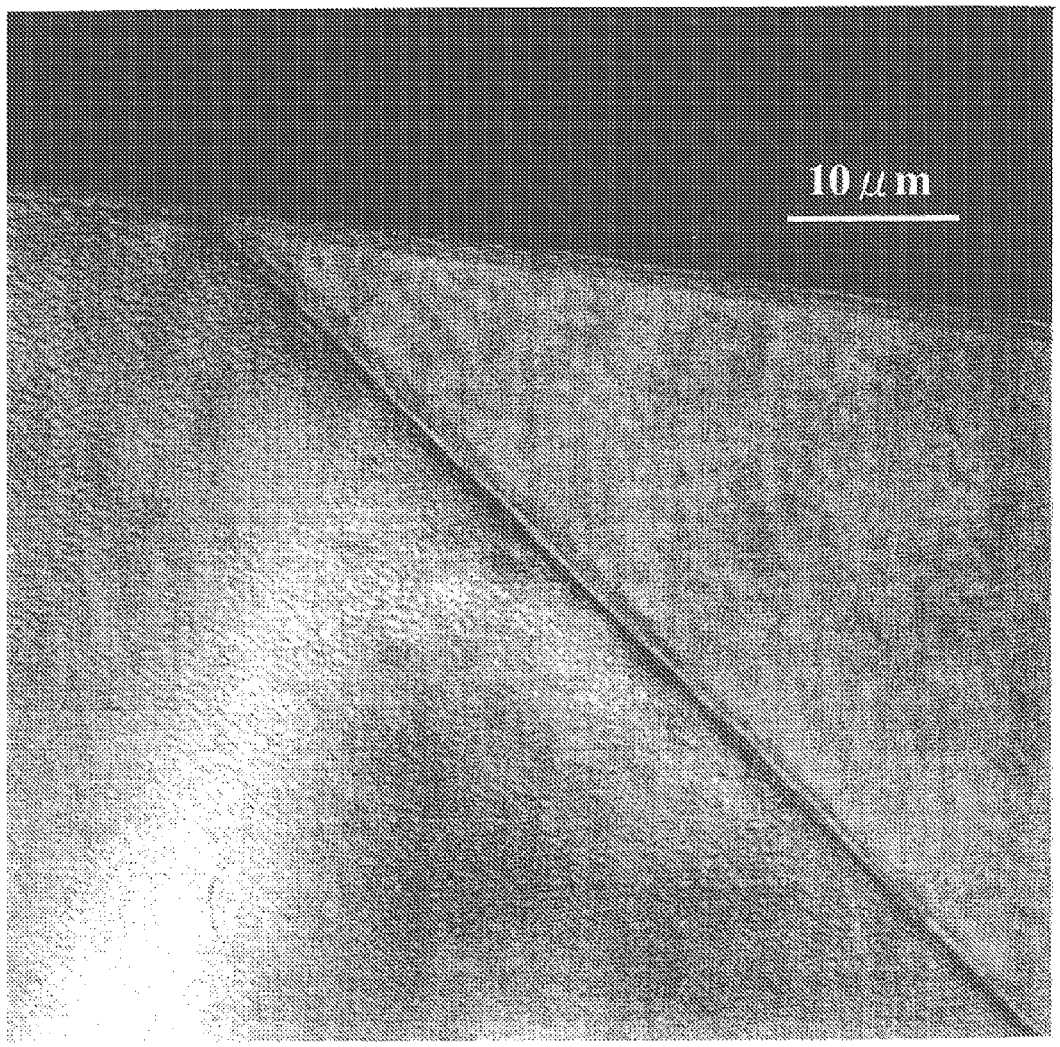
FIG. 16 is a TEM image of an aluminum oxide structure formed on a glass.
Figure 17:
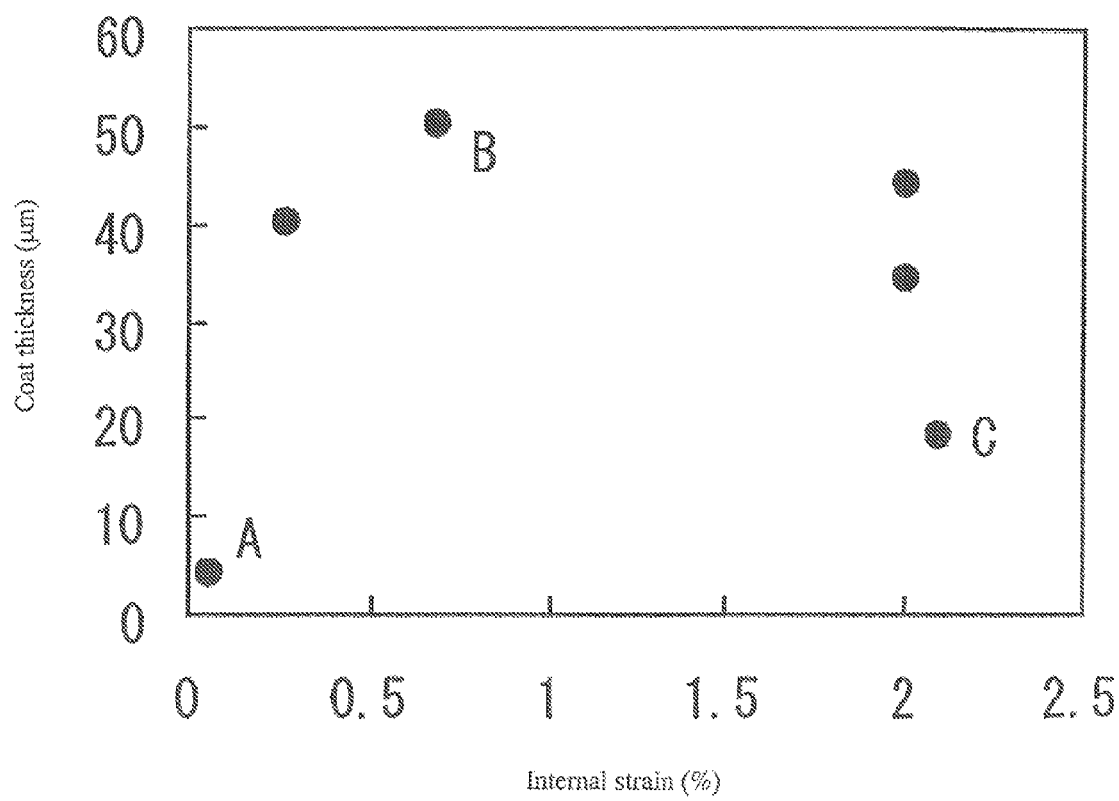
FIG. 17 is a graph showing the relationship between an internal strain and coat thickness of raw fine particles.
Figure 18:
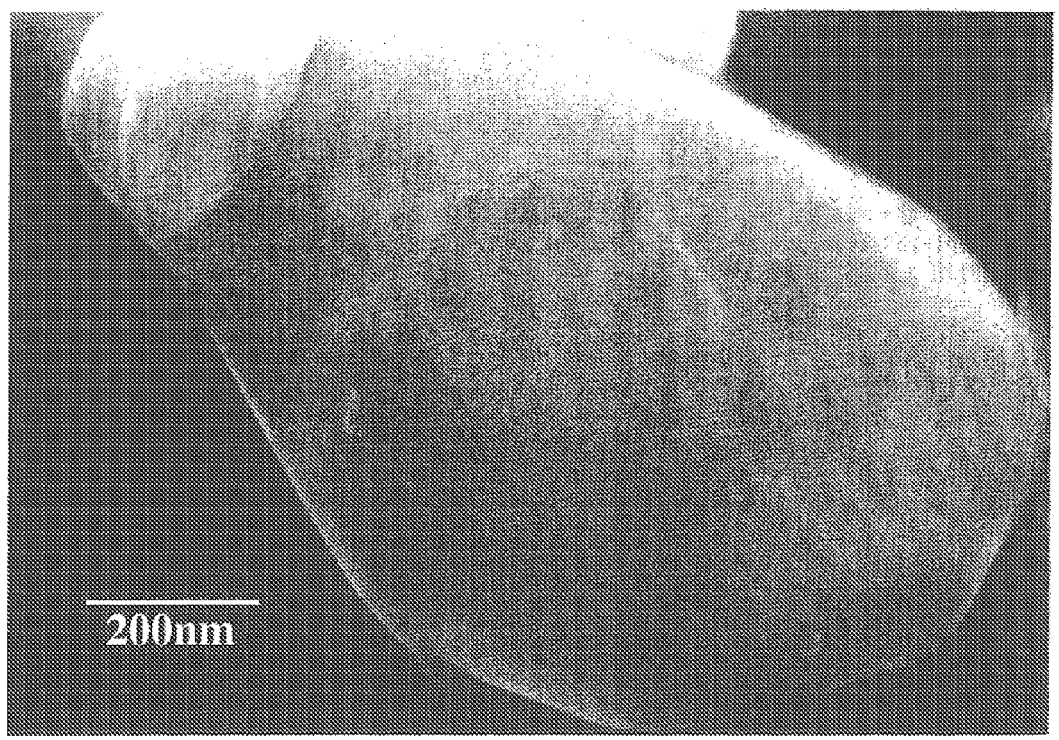
FIG. 18 is a SEM image of fine particles corresponding to the point A of FIG. 17.
Figure 20:
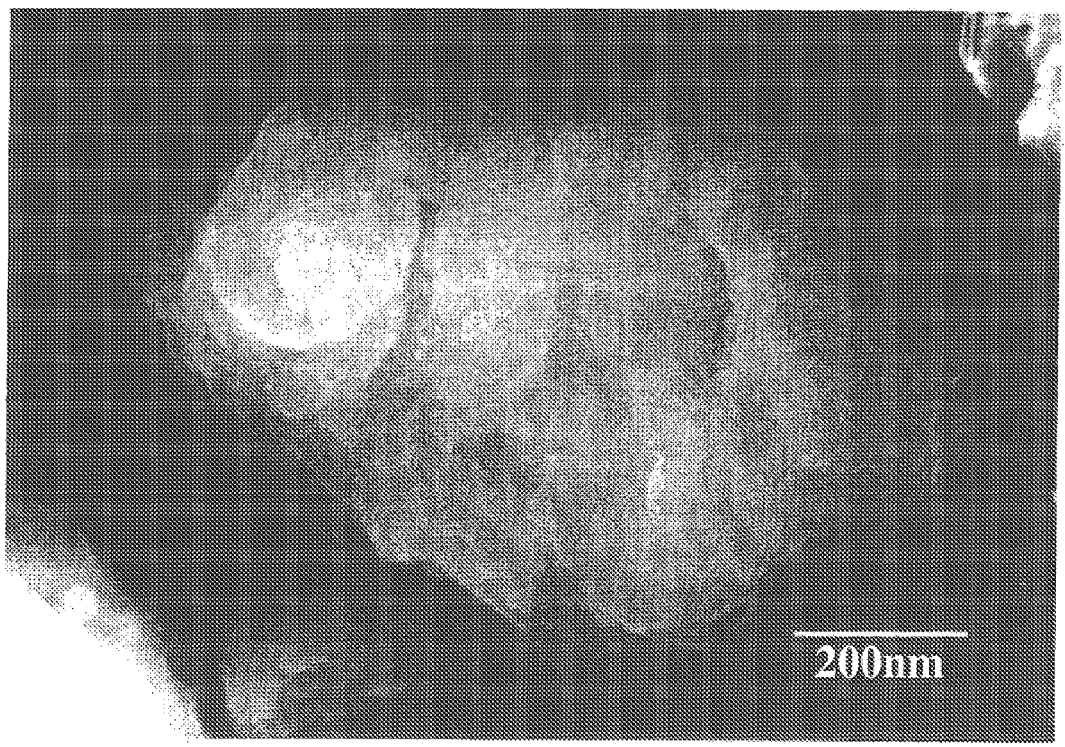
FIG. 20 is a SEM image of fine particles corresponding to the point C of FIG. 17.

FIG. 11 is a TEM image of a titanic acid lead zirconate (PZT) structure formed on a silicon oxide substrate using an ultra-fine particles beam deposition method among composite structure forming methods according to the present invention. FIG. 12 is a TEM image of raw particles of PZT used in the ultra-fine particles beam deposition method and FIG. 13 is a distribution chart showing crystallite size in the structure measured from the TEM image.

Internal strain of the raw particles was about 1% and the size of the raw particles was several hundreds nm. On the other hand, the crystallite size of the structure obtained from the figure is almost 40 nm or less and it was observed that these crystallites join together without leaving a space therebetween. It is not recognized that there is any crystal orientation, and there is no hyaline on a grain boundary of the crystals.

FIG. 14 is a SEM image which shows the surface roughness of the silicon oxide substrate before the titanic acid lead zirconate (PZT) structure is formed. FIG. 15 shows a TEM image at a boundary section between the titanic acid lead zirconate (PZT) structure and the silicon oxide substrate after the titanic acid lead zirconate (PZT) is formed. By comparing the two figures, FIG. 14 and FIG. 15, it is seen that a part of the titanic acid lead zirconate (PZT) structure bites into the silicon oxide substrate to form an anchor section.

The Vickers hardness of this structure is 300~500 kg f/mm$^2$. This means that the structure is provided with almost the same mechanical properties as a baked body.

Ninth Embodiment

FIG. 16 shows a TEM image of an aluminum oxide structure of a cubic content of $2\times10^{-9}$ m$^3$ formed on glass using the ultra-fine particle beam deposition method described above. FIG. 17 is a graph showing the relationship between an internal strain and coat thickness of raw fine particles.

The internal strain of the raw particles is about 1% and the size thereof is about 400 nm. It has also been observed that the size of crystallite forming the raw particles is 24 nm using the Scherrer & Hall Method which is an X-ray Diffraction Measuring Method (measuring instrument is an MXP-18 made by MAC Science Co., Ltd.). On the other hand, the crystallite size of the structure was 9.8 nm using the X-ray Diffraction Measuring Method. It is clear that the structure is a polycrystalline substance made of crystallites minuter than the raw particles.

A boundary layer (hyaline) in which the atomic arrangement is random can not be observed on the boundary face between crystallites from FIG. 16 and it is clear that the crystallites join together directly. It is observed that these crystallites are granular in which the aspect ratio does not exceed 2 to any great extent. The orientation of the crystal is random and compact.

This structure exhibits a Vickers hardness of 1000 kg f/mm$^2$ or more and has almost the same mechanical properties as a baked body.

Tenth Embodiment

The raw fine particles used in the eighth and ninth embodiments were pretreated to form the internal strain therein. On the other hand, when the raw fine particles without internal strain are used, desired results were not attained.

Experiments regarding the relationship between the internal strain and coat thickness have been made and the results are shown in FIG. 17. Milling was carried out on the aluminum oxide fine particles of which the purity is 99.6% using a planetary mill. After changing the characterization of the fine particles, a structure was formed on the aluminum substrate using the Ultra-Fine Particles Beam Deposition Method. The internal strain of the ultra-fine particles was measured by X-ray diffraction. Heat aging was applied to the fine particles to remove the internal strain therefrom. The condition in which the internal strain was removed was set as 0% of a strain amount to be used as a reference strain amount.

SEM photos (taken using Hitachi made In-lens SEM S-5000) of fine particles at the points A, B and C in FIG. 17 are shown in FIGS. 18, 19 and 20 respectively.

It is clear from FIG. 17 that an internal strain of 0.25%~2.0% is desirable. Referring to the relationship between a crack and the internal strain, if there is no internal strain, no crack is generated as shown in FIG. 18. However, If an internal strain greater than a fixed value (in the present invention, an internal strain more than 2.0%) is found, the crack has been completely formed and the fragments dropping from the crack adhere to the surface to form such a re-cohered condition as shown in FIG. 20.

Figure 19:
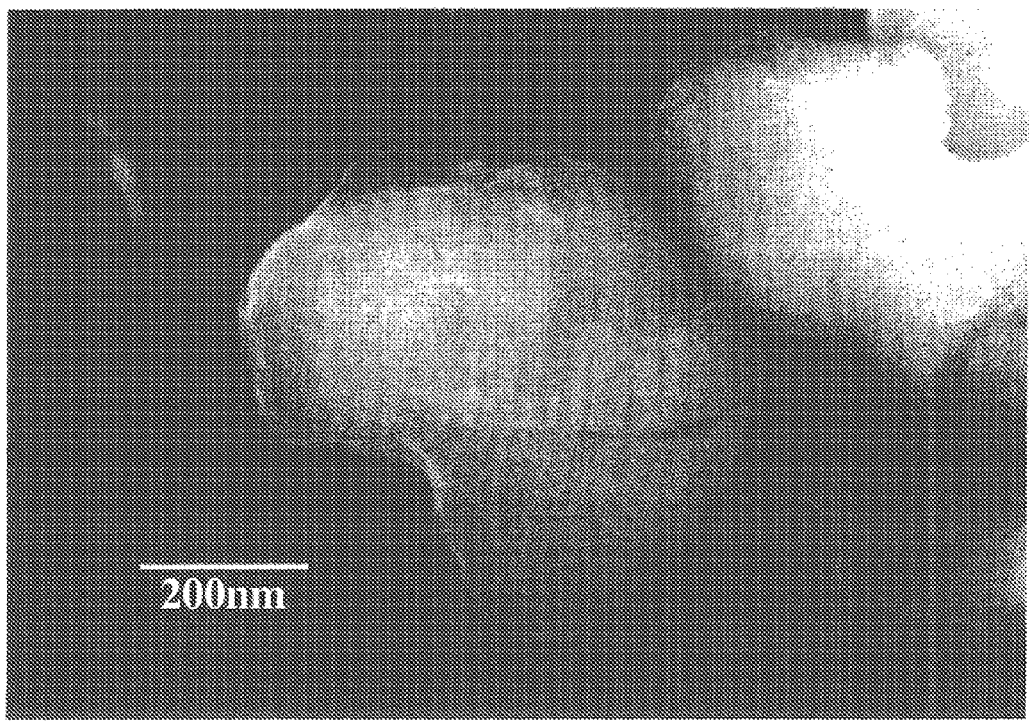
FIG. 19 is a SEM image of fine particles corresponding to the point B of FIG. 17.

As described above, in the milling treatment for imparting strain to the fine particles, it is desirable to use a milling means that can impart a large impact for milling the fine particles. This is because a comparatively equal and large strain can be imparted to the fine particles. As such a milling means, it is desirable to use a vibrating mill, attriter or planetary mill which can impart larger gravitational acceleration compared with a ball mill which is often used in the milling treatment of ceramics. In particular, it is most desirable to use a planetary mill that can impart an especially large gravitational acceleration rather than a ball mill. Referring to the condition of the fine particles, since the crack cancels the internal strain, it is most desirable to use fine particles in which the internal strain has increased until just before a crack is caused. FIG. 19 shows the condition in which some cracks are caused, but sufficient internal strain is still left.

As described above, in the composite structure according to the present invention, a composite structure is provided, in which a structure made of a brittle material such as a ceramic or metalloid is formed on a substrate surface, wherein the structure is polycrystalline and crystals forming the structure do not substantially exhibit crystal orientation, while a boundary layer made of hyaline does not exist on a boundary layer between crystals, and part of the structure is an anchor section biting into the substrate surface. Accordingly, the composite structure excels in joint strength with the substrate. Compactness of the structure itself is high and the size of constituent particles is uniform and extremely small. Accordingly, mechanical, electrical and chemical properties that were not available in the prior art can be expected.

Further, if the method of forming a composite structure according to the present invention is used, it is possible to form a high density and highly compact composite structure without baking.

Using the ceramic structure forming method according to the present invention, if the aerosol of ceramic ultra-fine particles is stably generated and the secondary particles in the aerosol are shredded before deposition, a compact ceramic structure can be suitably formed. Even though the substrate or nozzle is caused to move at a fixed speed, it is possible to maintain a fixed deposition thickness.

Eleventh Embodiment

This embodiment refers to a nonstoichiometric deficiency.

First, using aluminum oxide fine particles of 99.8% purity, an aluminum oxide thin coat ceramic structure of 8 μm thickness was formed on a brass substrate using the Ultra-Fine Particles Beam Deposition Method of the present invention in which the kind of gas and gas pressure in the aerosol have been changed. A measured value of electric resistivity (volume resistivity value) of this structure is shown below:

A: When nitrogen is 100%: Volume resistivity value=$4.2 \times 10^{10}$ Ω·cm

B: When nitrogen is 50% and oxygen is 50%: Volume resistivity value=$2.0 \times 10^{14}$ Ω·cm The volume resistivity of the aluminum oxide according to the literature is $10^{14-15}$ Ω·cm. It is generally known that electronic conductivity and ionic conductivity are generated by deficiency of oxygen in the aluminum oxide to provide a solid electrolyte of which the resistance value decreases. In this case, the volume resistivity value of a pure aluminum oxide can be used as an alternative characteristic.

Twelfth Embodiment

This embodiment refers to crystal orientation.

Using aluminum oxide fine particles of an average size of 0.4 μm, an aluminum oxide structure with the thickness of 20 μm was formed on a stainless substrate by the ultra-fine particles beam deposition method of the present invention. The crystal orientation of this structure was measured by the X-ray diffraction method (MXP-18 made by MAC Science Co., Ltd.). The measured results are shown in Table 1.

In Table 1, results of an integrated intensity calculation of four peak points of a typical face shape are shown by an intensity ratio where {hkl}={113} is 100. From the left, results where raw fine particles were measured by a thin coat optical system, results where the structure was measured by a thin coat optical system, JCPDS card 74-1081 corundum aluminum oxide data, and results where raw fine particles were measured by an integrated optical system are described respectively.

Since the results for the raw fine particles by the integrated optical system are almost the same as those for the raw fine particles by the thin coat optical system, the results for the raw powder by the thin coat optical system are set as a standard in a non-orientation condition. The deviation of the intensity ratio of the structure is shown as a percentage (see Table 2). When {113} is set as the standard, displacement of the remaining three peaks falls within 11% and it can be said that the structure substantially has no crystal orientation.

TABLE 1

| hkl | Raw fine particles (Thin coat optical system) | Structure (Thin coat optical system) | Card 74-1081 | Raw fine particles (Integrated optical system) |
| --- | --- | --- | --- | --- |
| 110 | 72.0 | 64.2 | 579 | 69.5 |
| 121 | 100 | 100 | 999 | 100 |
| 120 | 77.0 | 73.4 | 866 | 77.0 |
| 132 | 69.9 | 64.2 | 680 | 66.0 |

TABLE 2

| hkl | Displacement of orientation |
| --- | --- |
| 110 | 10.8% |
| 121 | 0% |
| 120 | 4.7% |
| 132 | 8.2% |

A composite structure according to the present invention is provided in which a ceramics structure of a predetermined thickness can be integrally formed on various substrates. Accordingly, the composite structure can be utilized in the following:

Minute mechanical parts, abrasion proof coat of magnetic heads, electrostatic chucks, sliding members, abrasion proof coating such as metal dies and repairing of worn sections and deficient sections, insulation coating of electrostatic motors, artificial bones, artificial roots of a tooth, condensers, electronic circuit parts, oxygen sensors, oxygen pumps, sliding sections of valve, strain gauges, pressure sensitive sensors, piezoelectric actuators, piezoelectric transformers, piezoelectric buzzers, piezoelectric filters, optical shutters, knock-sensors of motor vehicle, ultrasonic wave sensors, infrared ray sensors, vibration proof plates, tools for cutting work, surface coating of a drum for a copying machine, polycrystalline solar batteries, pigment sensitizing type solar batteries, surface coating of kitchen and other knives, balls of ball-point pens, temperature sensors, insulation coating of displays, superconductor coatings, Josephson junction devices, superplastic structural bodies, ceramic heaters, microwave dielectric substances, water repellent coatings, antireflection coatings, heat reflecting coatings, UV absorbent coatings, IMD (layer insulation coatings), shallow trench isolation (STI) or the like.

Although there have been described in detail what are the illustrative embodiments of the present invention, it will be understood by persons skilled in the art that variations and modifications may be made thereto without departing from the gist, spirit or essence of the invention. The scope of the invention is indicated by the appended claims.

What is claimed is:

1. An apparatus for forming a composite structure of a brittle material on a substrate surface comprising:
    an aerosol generator including a source of powder of brittle material, polycrystalline fine particles with an average particle size of 0.1-5 μm, and which generates an aerosol in which the fine powder particles are scattered in a gas;
    a structure forming chamber with a reduced pressure;
    a nozzle for ejecting the aerosol into the structure forming chamber; and
    a shredder for shredding cohesion of the brittle material, polycrystalline fine powder particles in the aerosol, the shredder being provided between the aerosol generator and the nozzle;
    wherein the apparatus, including the aerosol generator, the nozzle, and the shredder, causes the aerosol to be ejected at such speed that the brittle material, polycrystalline fine particles in the aerosol deform or fracture when they collide with the substrate surface and form a composite structure having compactness of at least 70% on the substrate surface.

2. The composite structure forming apparatus according to claim 1, further comprising a pretreatment device for creating internal strain in the brittle material fine particles.

3. The composite structure forming apparatus according to claim 1, further comprising an impact imparting mechanism which creates internal strain in the brittle material fine particles.

4. The composite structure forming apparatus according to claim 1, further comprising a substrate holder disposed within the structure forming chamber and which holds a substrate in opposing relation to the nozzle, and a position control device which controls position of the substrate holder relative to the nozzle.

5. The composite structure forming apparatus according to claim 4, wherein the position control device is a flexibly movable arm with the nozzle provided thereon.

6. The composite structure forming apparatus according to claim 1, wherein the aerosol generator comprises:
    a container for containing the powder of brittle material fine particles; and at least one of a vibration device for imparting a mechanical vibration action to the container and an electric field generating device for generating an electric field; wherein
    the container is provided with an introduction section for introducing the gas into the container, and a guide section for guiding the aerosol outside the container.

7. The composite structure forming apparatus according to claim 6, wherein the container is provided with a sieve, and the vibration device is provided to impart a mechanical vibration action to the container.

8. The composite structure forming apparatus according to claim 1, wherein the shredder includes an impact surface against which the aerosol collides to shred cohesion of the polycrystalline fine particles when the aerosol flows from the aerosol generator to the nozzle, wherein the composite structure forming apparatus causes the aerosol to collide with the impact surface at a lower speed than that at which the aerosol is ejected from the nozzle.

9. A composite structure forming apparatus according to claim 1, further comprising a classifier for classifying the brittle material fine particles in the aerosol.

10. The composite structure forming apparatus according to claim 9, wherein the shredder is provided with a plurality of introduction sections, and aerosol streams ejected from these introduction sections collide with one another for shredding.

11. The composite structure forming apparatus according to claim 1, wherein the shredder applies at least one of ultrasonic waves and microwaves to the aerosol.

12. The composite structure forming apparatus according to claim 1, wherein the composite structure forming apparatus causes the nozzle to eject the aerosol such that a speed of the brittle material, polycrystalline fine particles upon collision with the substrate surface is in a range of 150-400 m/s.

13. A composite structure forming apparatus according to claim 1, wherein the shredder includes an impact surface and said impact surface is arranged such that substantially all of the brittle material, polycrystalline fine particles in the aerosol impact against the surface before the aerosol is ejected from the nozzle.

14. A composite structure forming apparatus according to claim 1, wherein the composite structure forming apparatus forms the composite structure having compactness of at least 70% on the substrate surface at room temperature.

15. A composite structure forming apparatus according to claim 1, wherein the brittle material, polycrystalline fine particles are formed of material selected from the group consisting essentially of oxides, carbides, borides, compounds thereof, solid solutions of a hypercomplex system; piezoelectric/pyro-electric ceramics, extremely tough ceramics, living organism adaptable ceramics, metalloid substances, doped metalloid substances, and semiconductor compounds.

16. A composite structure forming apparatus according to claim 1, further comprising an exhaust pump connected to the structure forming chamber and which reduces a pressure in the structure forming chamber.

17. A composite structure forming apparatus for ejecting and causing an aerosol generated by scattering brittle material, polycrystalline fine particles in a gas to collide with a substrate at high speed to form a structure made of the brittle material, said apparatus comprising:
    an aerosol generator for generating the aerosol, the aerosol generator including a source of powder of the fine particles;
    a nozzle for ejecting the aerosol; and
    a shredder for shredding cohesion of the brittle material fine powder particles in the aerosol;
    wherein said shredder functions to achieve at least one of shredding the brittle material fine particles cohering in the aerosol and preventing cohesion of the brittle material fine particles in the aerosol, wherein the shredder is provided with a plurality of introduction sections, and aerosol streams ejected from these introduction sections collide with one another for shredding; and wherein the apparatus, including the aerosol generator, the nozzle, and the shredder, causes the aerosol to be ejected at such speed that the brittle material, polycrystalline fine particles in the aerosol deform or fracture when they collide with the substrate surface and form a composite structure having compactness of at least 70% on the substrate surface.

18. An apparatus for forming a composite structure of brittle material on a substrate surface via aerosol deposition, the apparatus comprising:

an aerosol generator including a source of powder of brittle material, polycrystalline fine particles with an average particle size of 0.1-5 μm, and which generates an aerosol in which the fine particles are scattered in a gas;

a structure forming chamber with a reduced pressure;

a nozzle which ejects the aerosol into the structure forming chamber; and a shredder operatively connected to the aerosol generator, and which shreds the brittle material fine powder particles cohering in the aerosol into substantially primary particles before the aerosol is ejected from the nozzle;

wherein the apparatus, including the aerosol generator, the nozzle, and the shredder, causes the aerosol to be ejected at such speed that the brittle material, polycrystalline fine particles in the aerosol deform or fracture when they collide with the substrate surface and form a composite structure having compactness of at least 70% on the substrate surface.

19. A composite structure forming apparatus according to claim 18, wherein the shredder comprises a plurality of introduction sections, and aerosol streams ejected from the plurality of introduction sections collide with one another for shredding the brittle particles cohering in the aerosol and preventing cohesion of the brittle material fine particles in the aerosol.

20. A composite structure forming apparatus according to claim 18, wherein the shredder has an impact surface against which the aerosol collides when the aerosol flows from the aerosol generator to the nozzle so as to shred the brittle material, polycrystalline fine particles cohering in the aerosol, and said impact surface is arranged such that substantially all of the brittle material, polycrystalline fine particles in the aerosol impact against the surface before being ejected from the nozzle.

21. A composite structure forming apparatus according to claims 18, wherein the composite structure forming apparatus ejects the aerosol from the nozzle such that a speed of the brittle material, polycrystalline fine particles upon collision with the substrate surface is in a range of 150-400 m/s.

22. A composite structure forming apparatus according to claim 18, wherein the shredder comprises at least one of an ultrasonic vibrator which applies ultrasonic waves to the aerosol and an oscillator which oscillates the polycrystalline fine particles in the aerosol.

23. A composite structure forming apparatus according claim 18, wherein the shredder includes an impact surface against which the aerosol collides to shred cohesion of the polycrystalline fine particles when the aerosol flows from the aerosol generator to the nozzle, wherein the composite structure forming apparatus causes the aerosol to collide with the impact surface at a lower speed than that at which the aerosol is ejected from the nozzle.

24. A composite structure forming apparatus according to claim 23, wherein the shredder further comprising an introduction section which directs a stream of the aerosol towards the impact surface, and the impact surface is disposed at an acute angle relative to the aerosol stream.

25. The composite structure forming apparatus according to claim 18, further comprising a pretreatment device for creating internal strain in the brittle material fine particles.

26. The composite structure forming apparatus according to claim 18, further comprising an impact imparting mechanism which creates internal strain in the brittle material fine particles.

27. The composite structure forming apparatus according to claim 18, further comprising a substrate holder disposed within the structure forming chamber and which holds a substrate in opposing relation to the nozzle, and a position control device which controls position of the substrate holder relative to the nozzle.

28. The composite structure forming apparatus according to claim 27, wherein the position control device is a flexibly movable arm with the nozzle provided thereon.

29. The composite structure forming apparatus according to claim 18, wherein the aerosol generator comprises:

a container for containing the powder of brittle material, polycrystalline fine particles; and at least one of a vibration device for imparting a mechanical vibration action to the container and an electric field generating device for generating an electric field; wherein the container is provided with an introduction section for introducing the gas into the container, and a guide section for guiding the aerosol outside the container.

30. The composite structure forming apparatus according to claim 29, wherein the container is provided with a sieve, and the vibration device is provided to impart a mechanical vibration action to the container.

31. A composite structure forming apparatus according to claim 18, further comprising an exhaust pump connected to the structure forming chamber and which reduces a pressure in the structure forming chamber.

* * * * *

UNITED STATES PATENT AND TRADEMARK OFFICE
CERTIFICATE OF CORRECTION

PATENT NO. : 7,553,376 B2
APPLICATION NO. : 11/419121
DATED : June 30, 2009
INVENTOR(S) : Akedo et al.

It is certified that error appears in the above-identified patent and that said Letters Patent is hereby corrected as shown below:

Title page:
 In item (73), "Assignees:", change "Science & Technology" to --Science And Technology--.
 In item (56), "References Cited", further under "OTHER PUBLICATIONS", change "Seiichirou, Kashu" to --Kashu, Seiichirou--;
  change "Shows 52" to --Showa 52--;
  before ""Preparation Of PZT" insert --Hong, Tan, et al.;--.
 In item (74), "*Attorney, Agent, or Firm*", change "Carrier Blackman" to --Carrier, Blackman--.

Column 1:
 Line 66, change "or less of which" to --or less, of which--.

Column 2:
 Line 29, change "evaporation unlike" to --evaporation, unlike--.

Column 3:
 Line 9, change "high temperature" to --high-temperature--.
 Line 53, change "300 m/sec. which are" to --300 m/sec, which are--.

Column 6:
 Line 43, change "PLZT; Extremely" to --PLZT; extremely--.

Column 7:
 Line 65, change "fine-particles" to --fine particles--.

Column 8:
 Line 25, change "present inventor" to --present inventors--.

Column 11:
 Line 29, change "object of a complicate" to --object of a complicated--.
 Line 60, change "powder which are filled" to --powder which is filled--.
 Line 61, change "material and are" to --material and is--.

Column 19:
 Line 10, line 11, line 13, and line 18, change "high frequency" to --high-frequency--.
 Line 45, change "particles des-" to --particles de- --.
 Line 46, change "orb and are" to --sorb and are--.
 Line 62, change "a space ther-" to --a space there- --.
 Line 63, change "ebetween. It is" to --between. It is--.

UNITED STATES PATENT AND TRADEMARK OFFICE
CERTIFICATE OF CORRECTION

PATENT NO.        : 7,553,376 B2
APPLICATION NO.   : 11/419121
DATED             : June 30, 2009
INVENTOR(S)       : Akedo et al.

It is certified that error appears in the above-identified patent and that said Letters Patent is hereby corrected as shown below:

Column 20:
   Line 64, change "However, If" to --However, if--.

Column 23:
   Line 61, begin a new sub-paragraph with "at least one of a vibration".

Column 25:
   Line 50, change "claims 18, wherein" to --claim 18, wherein--.

Column 26:
   Line 7, change "claim 18, wherein" to --to claim 18, wherein--.
   Line 38, begin a new sub-paragraph with "at least one of".

Signed and Sealed this

Twenty-fourth Day of November, 2009

David J. Kappos
*Director of the United States Patent and Trademark Office*